(12) United States Patent
Lindbo et al.

(10) Patent No.: US 11,203,487 B2
(45) Date of Patent: Dec. 21, 2021

(54) OBJECT HANDLING SYSTEM AND METHOD

(71) Applicant: OCADO INNOVATION LIMITED, Hatfield (GB)

(72) Inventors: Lars Sverker Ture Lindbo, Hatfield (GB); Andrew John Ingram-Tedd, Hatfield (GB)

(73) Assignee: OCADO INNOVATION LIMITED, Hatfield Herts (GB)

( * ) Notice: Subject to any disclaimer, the term of this patent is extended or adjusted under 35 U.S.C. 154(b) by 0 days.

(21) Appl. No.: 16/842,484

(22) Filed: Apr. 7, 2020

(65) Prior Publication Data

US 2020/0231381 A1 Jul. 23, 2020

Related U.S. Application Data

(63) Continuation of application No. 15/555,927, filed as application No. PCT/EP2016/058366 on Apr. 15, 2016, now Pat. No. 10,661,991.

(30) Foreign Application Priority Data

| Apr. 15, 2015 | (GB) | 1506365 |
| Aug. 13, 2015 | (GB) | 1514428 |

(Continued)

(51) Int. Cl.
*B65G 1/04* (2006.01)
*B65G 1/06* (2006.01)

(Continued)

(52) U.S. Cl.
CPC ............ *B65G 1/0464* (2013.01); *A01G 9/022* (2013.01); *A01G 9/16* (2013.01); *A01G 9/18* (2013.01);

(Continued)

(58) Field of Classification Search
CPC .... B65G 1/0464; B65G 1/0478; B65G 1/065; B65G 1/137; B65G 57/03
See application file for complete search history.

(56) References Cited

U.S. PATENT DOCUMENTS 2,701,065 A 2/1955 Bertel
3,744,193 A 7/1973 Lau et al.
(Continued)

FOREIGN PATENT DOCUMENTS

CN 1597466 A 3/2005
CN 101014517 A 8/2007
(Continued)

OTHER PUBLICATIONS

International Search Report (PCT/ISA/210) dated Jul. 15, 2016, by the European Patent Office as the International Searching Authority for International Application No. PCT/EP2016/058467.
(Continued)

*Primary Examiner* — Kaitlin S Joerger
(74) *Attorney, Agent, or Firm* — Buchanan Ingersoll & Rooney PC

(57) ABSTRACT

An object handling system is described, the system having two substantially perpendicular sets of rails forming a grid above a workspace, the workspace having a plurality of stacked containers. The system includes a series of robotic load handling devices operating on the grid above the workspace, the load handling devices having a body mounted on wheels. The robotic devices can move around the grid under instruction from a computing device, the robotic devices being moved to a point on the grid above a stack of containers and then, using a lifting device, engage and lift a container from the stack. The container is then moved to a point where the objects in the container can be accessed. Modifications to the workspace and grid are described that allow vehicles and roll cages to be used to (Continued)

move stacks from the workspace to a point outside the workspace or from outside the workspace into the workspace.

16 Claims, 19 Drawing Sheets

(30) Foreign Application Priority Data

| Oct. 13, 2015 | (GB) | 1518089 |
|---|---|---|
| Oct. 13, 2015 | (GB) | 1518091 |
| Oct. 13, 2015 | (GB) | 1518094 |
| Oct. 13, 2015 | (GB) | 1518111 |
| Oct. 13, 2015 | (GB) | 1518115 |
| Oct. 13, 2015 | (GB) | 1518117 |
| Feb. 9, 2016 | (GB) | 1602332 |
| Feb. 25, 2016 | (GB) | 1603328 |

(51) Int. Cl.

| B65G 57/03 | (2006.01) |
|---|---|
| E04H 6/18 | (2006.01) |
| A01G 9/02 | (2018.01) |
| A01G 9/16 | (2006.01) |
| A01G 9/18 | (2006.01) |
| A01G 31/06 | (2006.01) |
| A47L 7/00 | (2006.01) |
| B62D 33/02 | (2006.01) |
| B65D 21/02 | (2006.01) |
| B65G 1/137 | (2006.01) |
| B65G 63/00 | (2006.01) |
| B65G 67/02 | (2006.01) |
| E04B 1/348 | (2006.01) |
| E06B 9/68 | (2006.01) |

(52) U.S. Cl.
CPC ............ *A01G 31/06* (2013.01); *A47L 7/0047* (2013.01); *B62D 33/02* (2013.01); *B62D 33/0207* (2013.01); *B65D 21/0212* (2013.01); *B65G 1/0407* (2013.01); *B65G 1/0478* (2013.01); *B65G 1/065* (2013.01); *B65G 1/137* (2013.01); *B65G 57/03* (2013.01); *B65G 63/004* (2013.01); *B65G 67/02* (2013.01); *B65G 2207/22* (2013.01); *B65G 2207/40* (2013.01); *E04B 1/34807* (2013.01); *E04H 6/18* (2013.01); *E06B 9/68* (2013.01); *E06B 2009/6818* (2013.01); *Y02A 40/25* (2018.01); *Y02P 60/14* (2015.11); *Y02P 60/21* (2015.11); *Y10S 901/01* (2013.01)

(56) References Cited

U.S. PATENT DOCUMENTS

| 4,088,232 | A | 5/1978 | Lilly et al. |
|---|---|---|---|
| 4,561,554 | A | 12/1985 | Swincicki et al. |
| 4,599,829 | A | 7/1986 | DiMartino et al. |
| 4,723,381 | A | 2/1988 | Straumsnes et al. |
| 4,917,429 | A | 4/1990 | Giger |
| 4,973,219 | A | 11/1990 | Brickner et al. |
| 6,152,287 | A | 11/2000 | Luria |
| 6,654,662 | B1 | 11/2003 | Hognaland |
| 7,753,637 | B2* | 7/2010 | Benedict ............... B66C 13/08 414/140.3 |
| 8,371,797 | B2 | 2/2013 | Bonhomme |
| 8,408,863 | B1 | 4/2013 | Benedict et al. |
| 8,628,289 | B1 | 1/2014 | Benedict et al. |
| 9,151,770 | B2* | 10/2015 | Reuteler ............ G01N 35/1095 |
| 9,205,978 | B2* | 12/2015 | Alba ................. B66C 19/007 |
| 9,682,822 | B2* | 6/2017 | Lindbo ............... B65G 1/0464 |
| 9,845,208 | B2* | 12/2017 | Lindbo ............... B65G 59/063 |
| 9,862,579 | B2* | 1/2018 | Hognaland ............... B66F 9/06 |
| 10,000,337 | B2* | 6/2018 | Lindbo ............... B65G 1/0464 |
| 10,035,651 | B2* | 7/2018 | Lindbo ............... G05B 15/02 |
| 10,242,399 | B2 | 3/2019 | Kanellos et al. |
| 10,414,585 | B2* | 9/2019 | Hamaguchi ........ B65G 1/0464 |
| 10,577,178 | B2* | 3/2020 | Lindbo ............... B65G 1/0492 |
| 10,661,991 | B2 | 5/2020 | Lindbo et al. |
| 2002/0057956 | A1 | 5/2002 | Jephcott et al. |
| 2002/0102150 | A1 | 8/2002 | Dunstan |
| 2003/0005626 | A1 | 1/2003 | Yoneda et al. |
| 2003/0141973 | A1 | 7/2003 | Yeh et al. |
| 2003/0156501 | A1 | 8/2003 | Spindel et al. |
| 2004/0016624 | A1 | 1/2004 | Jephcott et al. |
| 2005/0220573 | A1 | 10/2005 | Benedict et al. |
| 2006/0201377 | A1 | 9/2006 | Gielow et al. |
| 2007/0016328 | A1 | 1/2007 | Ziegler et al. |
| 2008/0075566 | A1 | 3/2008 | Benedict et al. |
| 2008/0075568 | A1 | 3/2008 | Benedict et al. |
| 2008/0075569 | A1 | 3/2008 | Benedict et al. |
| 2008/0134458 | A1 | 6/2008 | Ziegler et al. |
| 2008/0140255 | A1 | 6/2008 | Ziegler et al. |
| 2008/0155768 | A1 | 7/2008 | Ziegler et al. |
| 2008/0213073 | A1 | 9/2008 | Benedict et al. |
| 2008/0226437 | A1 | 9/2008 | de Milly |
| 2010/0275512 | A1 | 11/2010 | Nien et al. |
| 2010/0310349 | A1 | 12/2010 | Bonhomme |
| 2011/0027059 | A1 | 2/2011 | Benedict et al. |
| 2011/0192082 | A1 | 8/2011 | Uchiyama |
| 2011/0271469 | A1 | 11/2011 | Ziegler et al. |
| 2012/0036659 | A1 | 2/2012 | Ziegler et al. |
| 2012/0147558 | A1 | 6/2012 | Dunn et al. |
| 2012/0272500 | A1 | 11/2012 | Reuteler et al. |
| 2013/0011226 | A1 | 1/2013 | Camenisch et al. |
| 2014/0026474 | A1 | 1/2014 | Kulas et al. |
| 2014/0069007 | A1 | 3/2014 | Chen et al. |
| 2014/0191633 | A1 | 7/2014 | Zhu et al. |
| 2014/0283452 | A1 | 9/2014 | Dittman et al. |
| 2014/0289992 | A1 | 10/2014 | Ziegler et al. |
| 2015/0045944 | A1 | 2/2015 | Visser et al. |
| 2015/0127143 | A1 | 5/2015 | Lindbo et al. |
| 2016/0095309 | A1 | 4/2016 | Beat |
| 2016/0129587 | A1 | 5/2016 | Lindbo et al. |
| 2016/0140488 | A1 | 5/2016 | Lindbo |
| 2018/0072499 | A1 | 3/2018 | Mountz et al. |
| 2018/0093828 | A1 | 4/2018 | Lindbo et al. |

FOREIGN PATENT DOCUMENTS

| CN | 101861277 | A | 10/2010 |
|---|---|---|---|
| CN | 103738640 | A | 4/2014 |
| CN | 104030046 | A | 9/2014 |
| DE | 2719953 | A1 | 7/1978 |
| DE | 4439740 | C1 | 5/1996 |
| DE | 102011103443 | A1 | 12/2012 |
| DE | 102012025154 | A1 | 6/2014 |
| EP | 1037828 | A1 | 9/2000 |
| EP | 0767113 | B1 | 7/2002 |
| EP | 2133289 | A1 | 12/2009 |
| EP | 2308283 | A1 | 4/2011 |
| EP | 2783913 | A2 | 10/2014 |
| EP | 2829210 | A2 | 1/2015 |
| EP | 3283417 | A1 | 2/2018 |
| GB | 1157145 | A | 7/1969 |
| GB | 2514930 | A | 12/2014 |
| GB | 2518259 | A | 3/2015 |
| GB | 2520104 | A | 5/2015 |
| GB | 2527543 | A | 12/2015 |
| GB | 2528573 | A | 1/2016 |
| GB | 2529029 | A | 2/2016 |
| GB | 2529527 | A | 2/2016 |
| JP | H09299496 | A | 11/1997 |
| JP | 2000255786 | A | 9/2000 |
| JP | 2001139108 | A | 5/2001 |
| LU | 88754 | A1 | 10/1996 |
| NO | 317366 | B1 | 10/2004 |
| WO | 9204713 | A1 | 3/1992 |
| WO | 9737928 | A1 | 10/1997 |
| WO | 9849075 | A1 | 11/1998 |

(56) References Cited

FOREIGN PATENT DOCUMENTS

| WO | 03031285 | A1 | 4/2003 |
|---|---|---|---|
| WO | 03095339 | A1 | 11/2003 |
| WO | 2004096609 | A1 | 11/2004 |
| WO | 2008108845 | A2 | 9/2008 |
| WO | 2011047710 | A1 | 4/2011 |
| WO | 2013082601 | A1 | 6/2013 |
| WO | 2013147597 | A1 | 10/2013 |
| WO | 2013162192 | A1 | 10/2013 |
| WO | 2013167907 | A1 | 11/2013 |
| WO | 2013169110 | A1 | 11/2013 |
| WO | 2014195901 | A1 | 12/2014 |
| WO | 2014203126 | A1 | 12/2014 |
| WO | 2015105426 | A1 | 7/2015 |
| WO | 2016166294 | A1 | 10/2016 |

OTHER PUBLICATIONS

Written Opinion (PCT/ISA/237) dated Jul. 15, 2016, by the Japanese Patent Office as the International Searching Authority for International Application No. PCT/EP2016/058467.
International Search Report (PCT/ISA/210) dated Jul. 20, 2016, by the European Patent Office as the International Searching Authority for International Application No. PCT/EP2016/058466.
Written Opinion (PCT/ISA/237) dated Jul. 20, 2016, by the Japanese Patent Office as the International Searching Authority for International Application No. PCT/EP2016/058466.
International Search Report (PCT/ISA/210) dated Jul. 18, 2016, by the European Patent Office as the International Searching Authority for International Application No. PCT/EP2016/058405.
Written Opinion (PCT/ISA/237) dated Jul. 18, 2016, by the Japanese Patent Office as the International Searching Authority for International Application No. PCT/EP2016/058405.
International Search Report (PCT/ISA/210) dated Jul. 14, 2016, by the European Patent Office as the International Searching Authority for International Application No. PCT/EP2016/058385.
Written Opinion (PCT/ISA/237) dated Jul. 14, 2016, by the Japanese Patent Office as the International Searching Authority for International Application No. PCT/EP2016/058385.
International Search Report (PCT/ISA/210) dated Jul. 19, 2016, by the European Patent Office as the International Searching Authority for International Application No. PCT/EP2016/058384.
Written Opinion (PCT/ISA/237) dated Jul. 19, 2016, by the Japanese Patent Office as the International Searching Authority for International Application No. PCT/EP2016/058384.
International Search Report (PCT/ISA/210) dated Jul. 18, 2016, by the European Patent Office as the International Searching Authority for International Application No. PCT/EP2016/058381.
Written Opinion (PCT/ISA/237) dated Jul. 18, 2016, by the Japanese Patent Office as the International Searching Authority for International Application No. PCT/EP2016/058381.
International Search Report (PCT/ISA/210) dated Aug. 30, 2016, by the European Patent Office as the International Searching Authority for International Application No. PCT/EP2016/058366.
Written Opinion (PCT/ISA/237) dated Aug. 30, 2016, by the Japanese Patent Office as the International Searching Authority for International Application No. PCT/EP2016/058366.
International Search Report (PCT/ISA/210) dated Jul. 14, 2016, by the European Patent Office as the International Searching Authority for International Application No. PCT/EP2016/058407.
Written Opinion (PCT/ISA/237) dated Jul. 14, 2016, by the Japanese Patent Office as the International Searching Authority for International Application No. PCT/EP2016/058407.
Search Report dated Dec. 22, 2016, by the European Patent Office for Application No. 1606679.7.
Search Report dated Dec. 21, 2016, by the European Patent Office for Application No. 1606677.1.
Search Report dated Mar. 8, 2016, by the European Patent Office for Application No. 1518089.6.
The First Search issued in corresponding Chinese Patent Application No. 2016800219088 by the Chinese Patent Office dated Mar. 19, 2019 (1 page).
Office Action (Notification of Reason for Refusal) dated Mar. 25, 2021, by the Korean Patent Office in corresponding Korean Patent Application No. 10-2017-7025225, and an English Translation of the Office Action. (8 pages).
Office Action dated Mar. 1, 2021, by the Canadian Patent Office in corresponding Canadian Patent Application No. 2,978,143. (4 pages).
English Translation of the First Office Action dated Nov. 17, 2020, by the Japanese Patent Office in corresponding Japanese Patent Application No. 2018-524491. (11 pages).
Third Office Action dated Nov. 12, 2020, by the Chinese Patent Office in corresponding Chinese Patent Application No. 201680021908.8, and an English Translation of the Office Action. (8 pages).

* cited by examiner

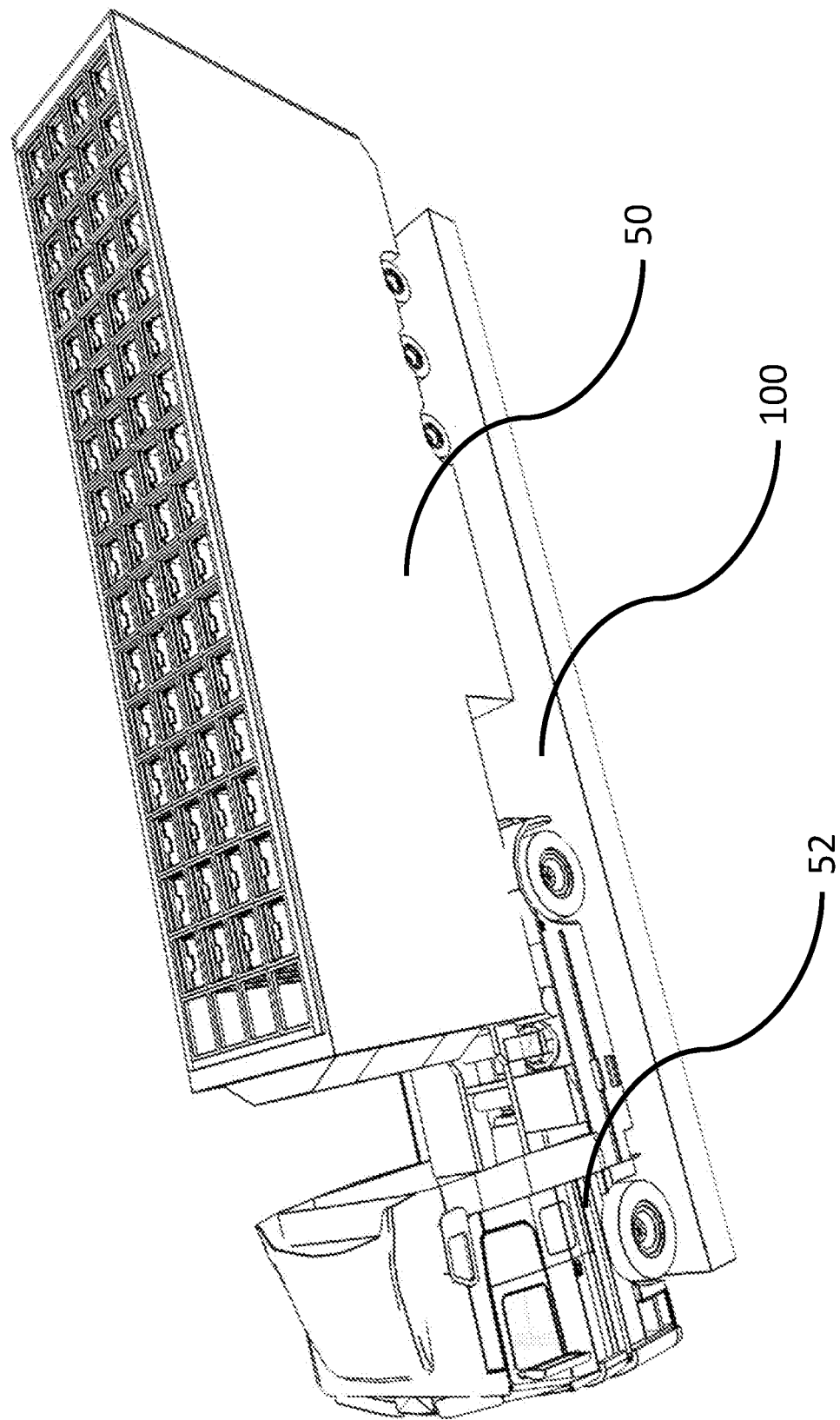

OBJECT HANDLING SYSTEM AND METHOD

CROSS REFERENCE TO RELATED APPLICATIONS

This application is a continuation of U.S. application Ser. No. 15/555,927, filed Sep. 5, 2017, which is a U.S. National Phase application of International Application No. PCT/EP2016/058366, filed Apr. 15, 2016, each incorporated herein by reference in its entirety.

The present invention relates an object handling system and method. More specifically but not exclusively, it relates to a storage and retrieval system using stackable containers in a grid structure, where the containers, holding objects, are transported using robotic handling devices travelling on top of the grid structure. Furthermore, it relates to a range of variations to the grid structure that enables the efficient exchange of containers between handling systems at different locations.

This application claims priority from UK Patent Application Nos. GB1506365.4 filed 15 Apr. 2015, GB1514428.0 filed 13 Aug. 2015, GB1518089.6 filed 13 Oct. 2015, GB1602332.7 filed 9 Feb. 2016, GB1518091.2 filed 13 Oct. 2015, GB1518094.6 filed 13 Oct. 2015, GB1518111.8 filed 13 Oct. 2015, GB1518115.9 filed 13 Oct. 2015, GB1518117.5 filed 13 Oct. 2015 and GB1603328.4 filed 25 Feb. 2016 the content of all these applications hereby being incorporated by reference.

Some commercial and industrial activities require systems that enable the storage and retrieval of a large number of different products. One known type of system for the storage and retrieval of items in multiple product lines involves arranging storage bins or containers in stacks on top of one another, the stacks being arranged in rows. The storage bins or containers are accessed from above, removing the need for aisles between the rows and allowing more containers to be stored in a given space.

Methods of handling containers stacked in rows have been well known for decades. In some such systems, for example as described in U.S. Pat. No. 2,701,065, to Bertel comprise free-standing stacks of containers arranged in rows in order to reduce the storage volume associated with storing such containers but yet still providing access to a specific container if required. Access to a given container is made possible by providing relatively complicated hoisting mechanisms which can be used to stack and remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B to Cimcorp. '113 discloses a mechanism for removing a plurality of stacked containers, using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack).

In the system described in '113, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler.

EP 1037828 B1 (Autostore) the contents of which are incorporated herein by reference, describes a system in which stacks of containers are arranged within a frame structure. A system of this type is illustrated schematically in FIGS. 1 to 4 of the accompanying drawings. Robotic load handling devices can be controllably moved around the stack on a system of tracks on the upper most surface of the stack.

One form of robotic load handling device is further described in Norwegian patent number 317366, the contents of which are incorporated herein by reference FIGS. 3(a) and 3(b) are schematic perspective views of a load handling device from the rear and front, respectively, and FIG. 3(c) is a schematic front perspective view of a load handling device lifting a bin.

A further development of load handling device is described in UK Patent Application No GB1413155.1 filed 24 Jul. 2014 incorporated herein by reference, where each robotic load handler only covers one grid space, thus allowing higher density of load handlers and thus higher throughput of a given size system.

With these types of systems, there could from time to time be a need to transfer large numbers of storage containers from one system to another one at a different location. One such example is if a company operates multiple fulfilment centres servicing different geographical areas, such as described in UK Patent Application No GB 1419498.9. Variable demand may mean that some items are running out of stock at one location, while they are in surplus at another location. It may also be beneficial to receive and put in to containers a large quantity of an item at one place, rather than many smaller quantities of the same item at several locations. In such cases, there is a need to find an efficient way of transferring large number of containers from a storage system to a vehicle and then from the vehicle into another storage system. The present invention provides a number of such efficient ways.

According to the invention there is provided an object handling system comprising two substantially perpendicular sets of rails forming a grid above a workspace, the workspace comprising a plurality of stacked containers, the handling system further comprising a plurality of robotic load handling devices operating on the grid above the workspace, the load handling devices comprising a body mounted on wheels, a first set of wheels being arranged to engage with at least two rails of the first set of rails, the second set of wheels being arranged to engage with at least two rails of the second set of rails, the first set of wheels being independently moveable and driveable with respect to the second set of wheels such that when in motion only one set of wheels is engaged with the grid at any one time thereby enabling movement of the load handling device along the rails to any point on the grid by driving only the set of wheels engaged with the rails, the load handling devices further comprising means for removing or replacing containers from the stacks, wherein a portion of the stacks of containers are independently moveable with respect to the remaining stacks in the workspace.

According to the invention there is further provided an object handling system comprising two substantially perpendicular sets of rails forming a grid above a workspace, the workspace comprising a plurality of stacked containers, the handling system further comprising a plurality of robotic load handling devices operating on the grid above the workspace, the load handling devices comprising a body mounted on wheels, a first set of wheels being arranged to engage with at least two rails of the first set of rails, the second set of wheels being arranged to engage with at least two rails of the second set of rails, the first set of wheels being independently moveable and driveable with respect to the second set of wheels such that when in motion only one set of wheels is engaged with the grid at any one time thereby enabling movement of the load handling device along the rails to any point on the grid by driving only the set of wheels engaged with the rails, the load handling devices further comprising means for removing or replacing containers from the stacks wherein a portion of the grid extends beyond the workspace such that at least one stack of containers may be positioned under the extended grid, the system being provided with means for moving load handling devices to the extended grid to enable individual containers to be removed from or replaced into the workspace to or from stacks of containers located outside the workspace.

According to a further aspect of the invention there is provided a vehicle for use with an object handling system, the object handling system comprising two substantially perpendicular sets of rails forming a grid above a workspace, the workspace comprising a plurality of stacked containers, the handling system further comprising a plurality of robotic load handling devices operating on the grid above the workspace, the load handling devices comprising a body mounted on wheels, a first set of wheels being arranged to engage with at least two rails of the first set of rails, the second set of wheels being arranged to engage with at least two rails of the second set of rails, the first set of wheels being independently moveable and driveable with respect to the second set of wheels such that when in motion only one set of wheels is engaged with the grid at any one time thereby enabling movement of the load handling device along the rails to any point on the grid by driving only the set of wheels engaged with the rails, the load handling devices further comprising means for removing or replacing containers from the stacks, wherein the vehicle comprises a portion of grid, the grid being sized and shaped so as to interface with the grid of the object handling system.

According to the invention there is additionally provided an object handling system comprising two substantially perpendicular sets of rails forming a grid above a workspace, the workspace comprising a plurality of stacked containers, the handling system further comprising a plurality of robotic load handling devices operating on the grid above the workspace, the load handling devices comprising a body mounted on wheels, a first set of wheels being arranged to engage with at least two rails of the first set of rails, the second set of wheels being arranged to engage with at least two rails of the second set of rails, the first set of wheels being independently moveable and driveable with respect to the second set of wheels such that when in motion only one set of wheels is engaged with the grid at any one time thereby enabling movement of the load handling device along the rails to any point on the grid by driving only the set of wheels engaged with the rails, the load handling devices further comprising means for removing or replacing containers from the stacks, the object handling system further comprising alignment means, the alignment means being located such that vehicles for removing and transporting a plurality of containers from the stacks within the system to alternative locations may be accurately positioned to allow transfer of said containers via load handling devices to said vehicles.

24. An object handling system according to claim 23 further comprising interface means, the interface means comprising a portion of substantially horizontal grid structure thereby enabling the vehicle and the system to be temporarily joined to allow movement of load handling devices therebetween.

The invention will now be described with reference to the accompanying diagrammatic drawings in which.

Figure 1:
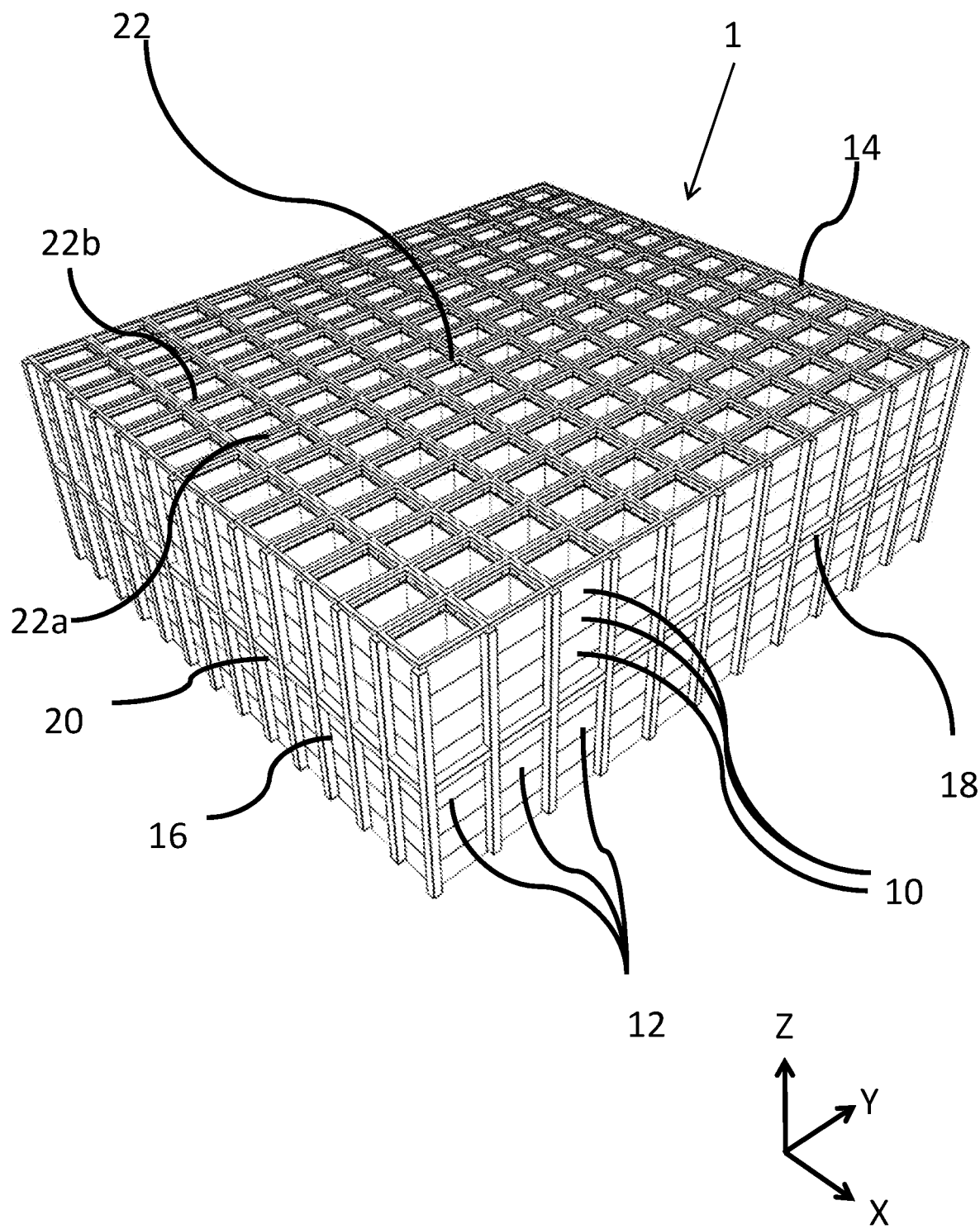
FIG. 1 is a schematic perspective view of a frame structure for housing a plurality of stacks of bins in a known storage system.
Figure 2:
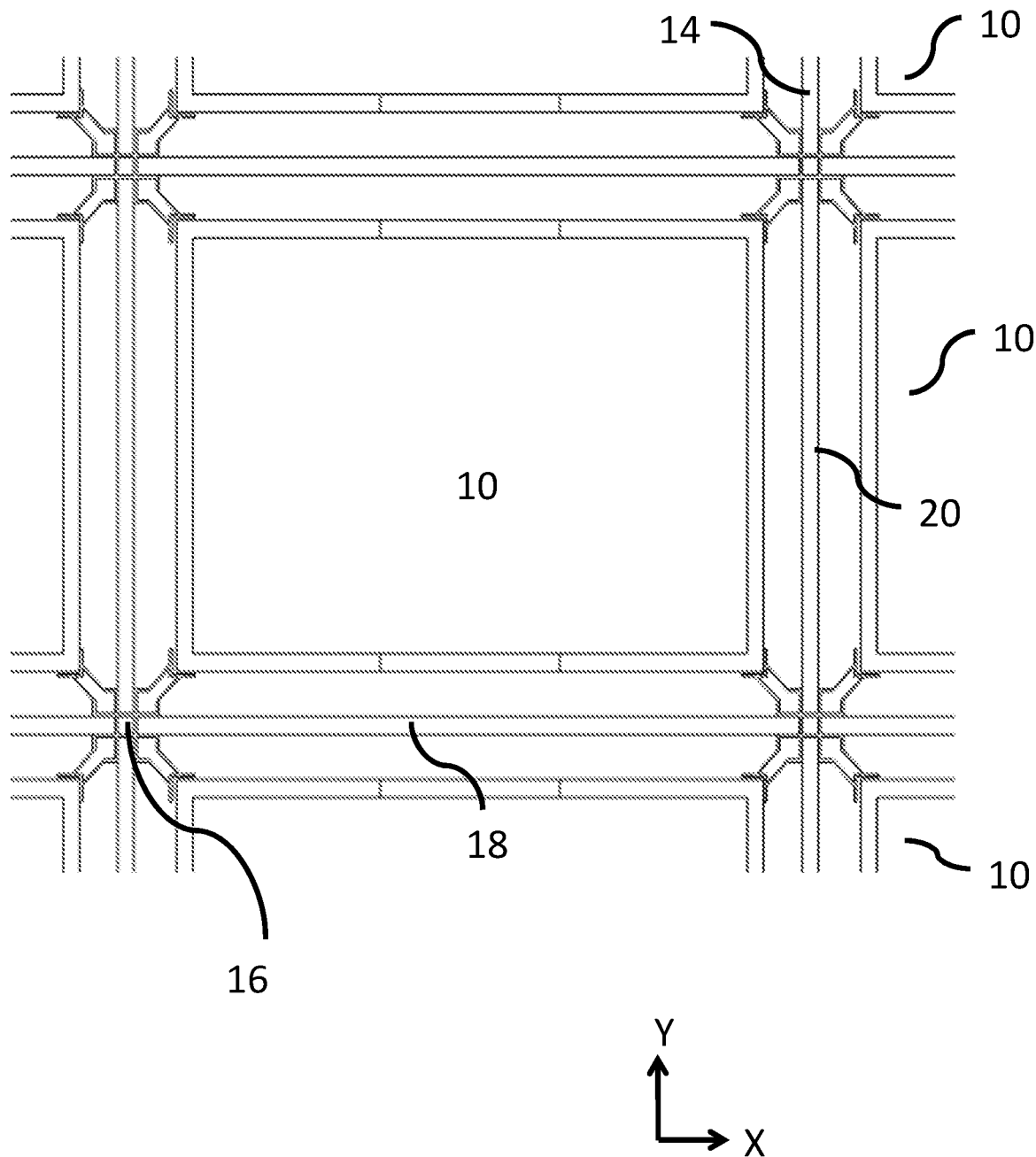
FIG. 2 is a schematic plan view of part of the frame structure of FIG. 1.
Figure 3A:
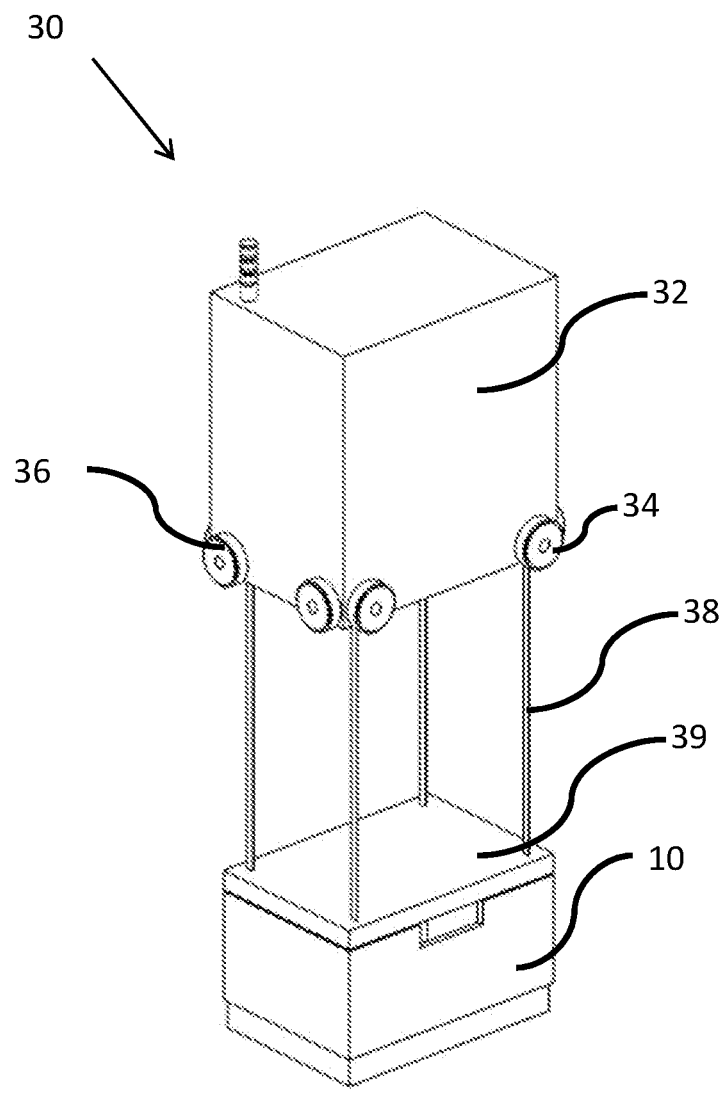
Figures 3B, 3C:
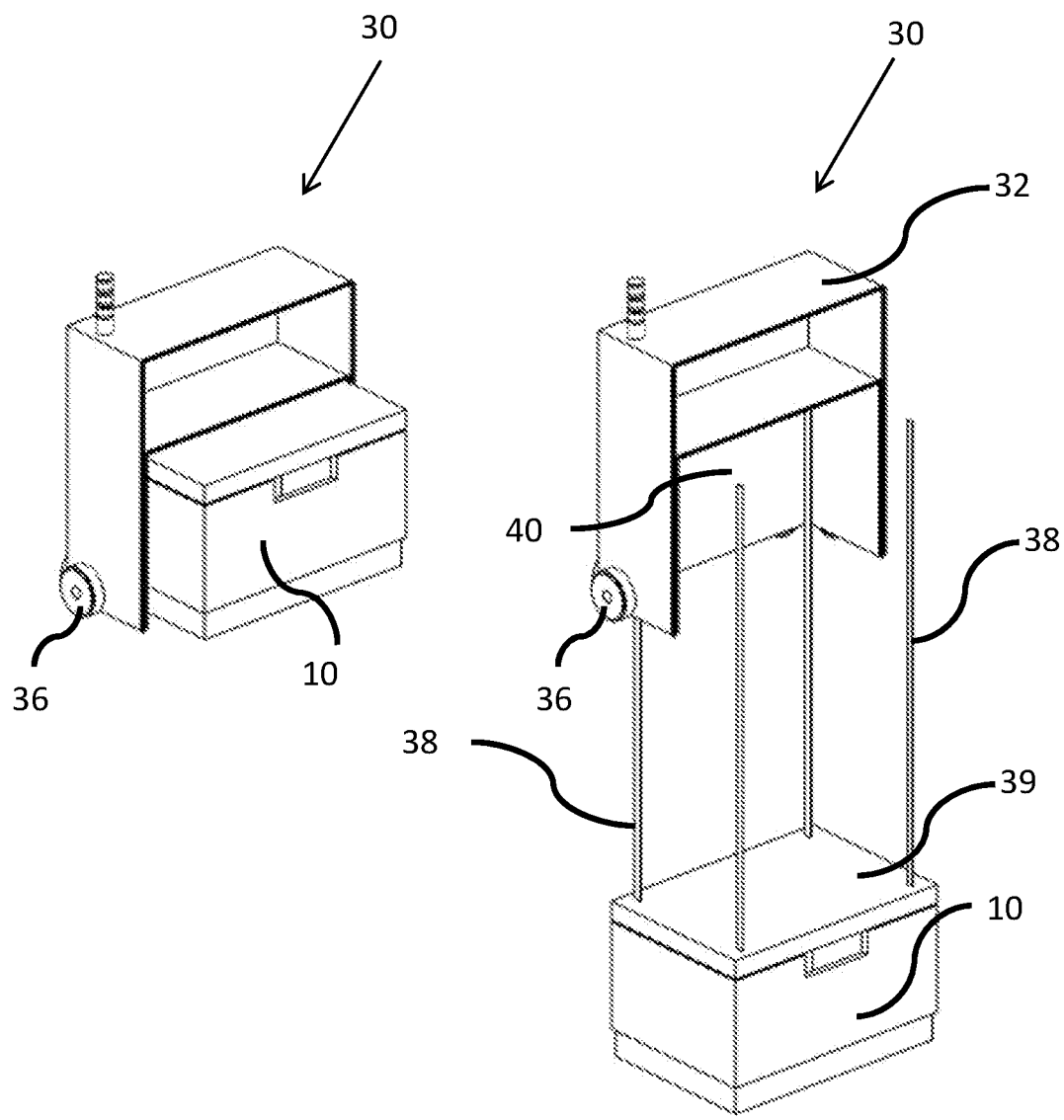
Figure 4:
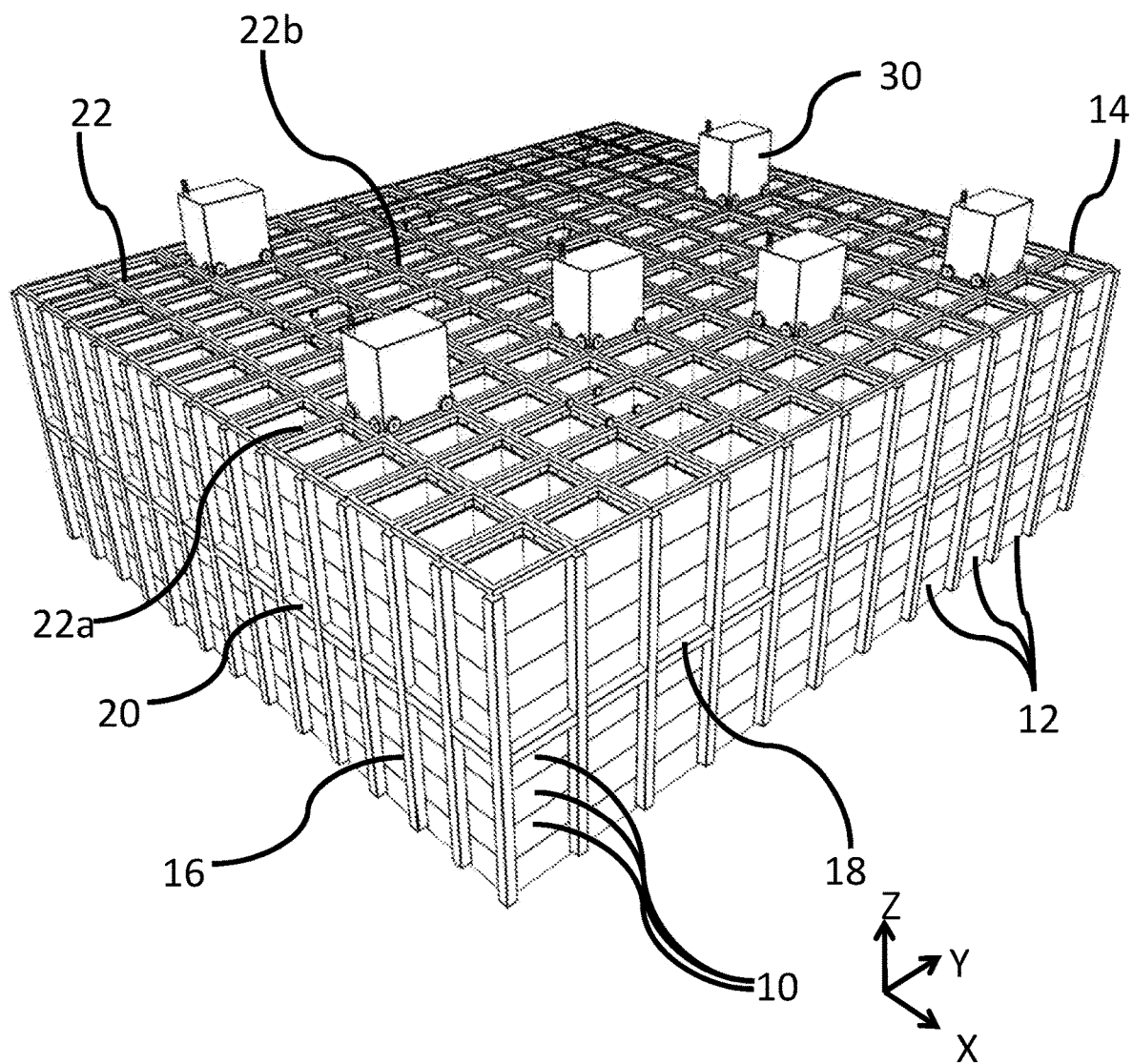
Figure 5A:
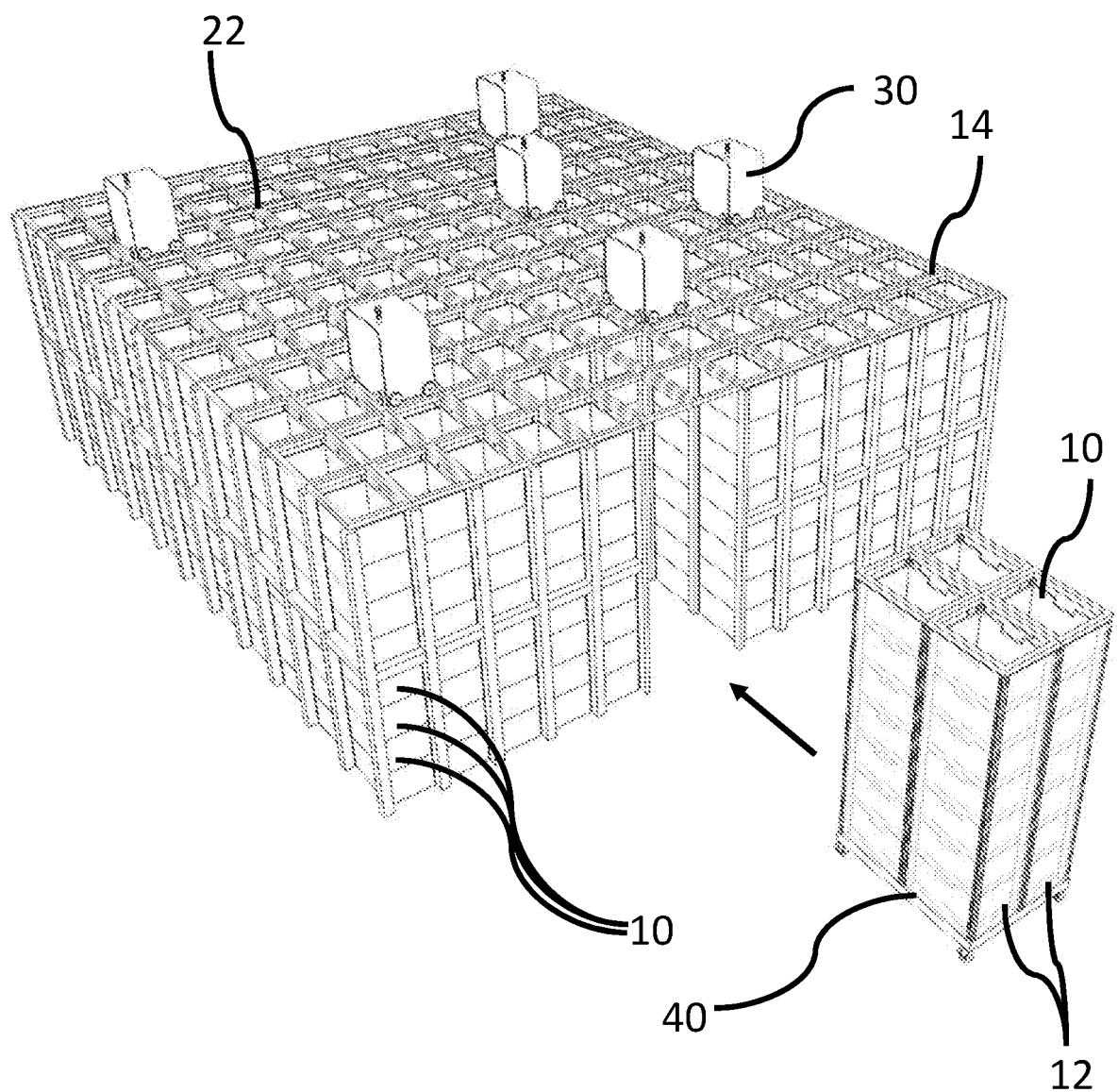
Figure 5B:
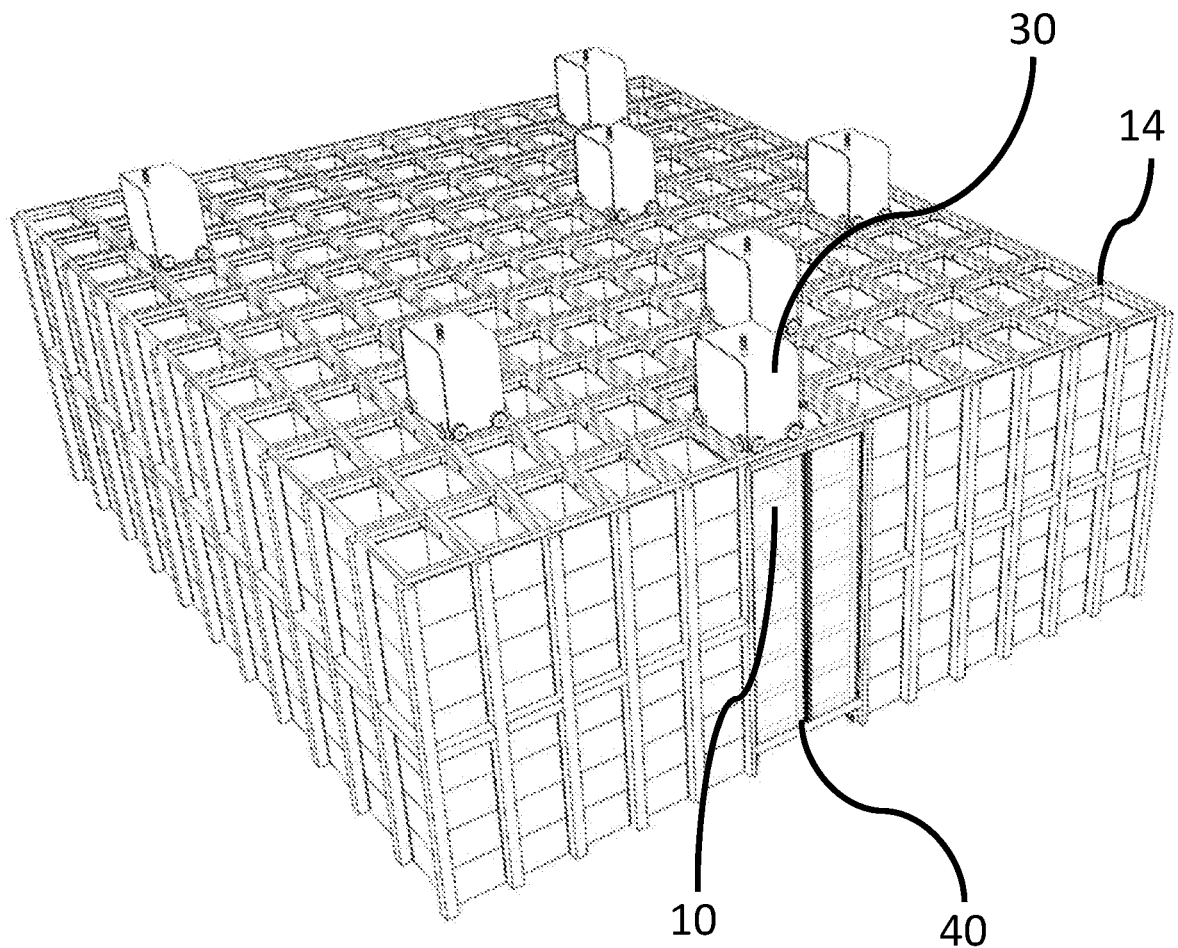
Figure 6:
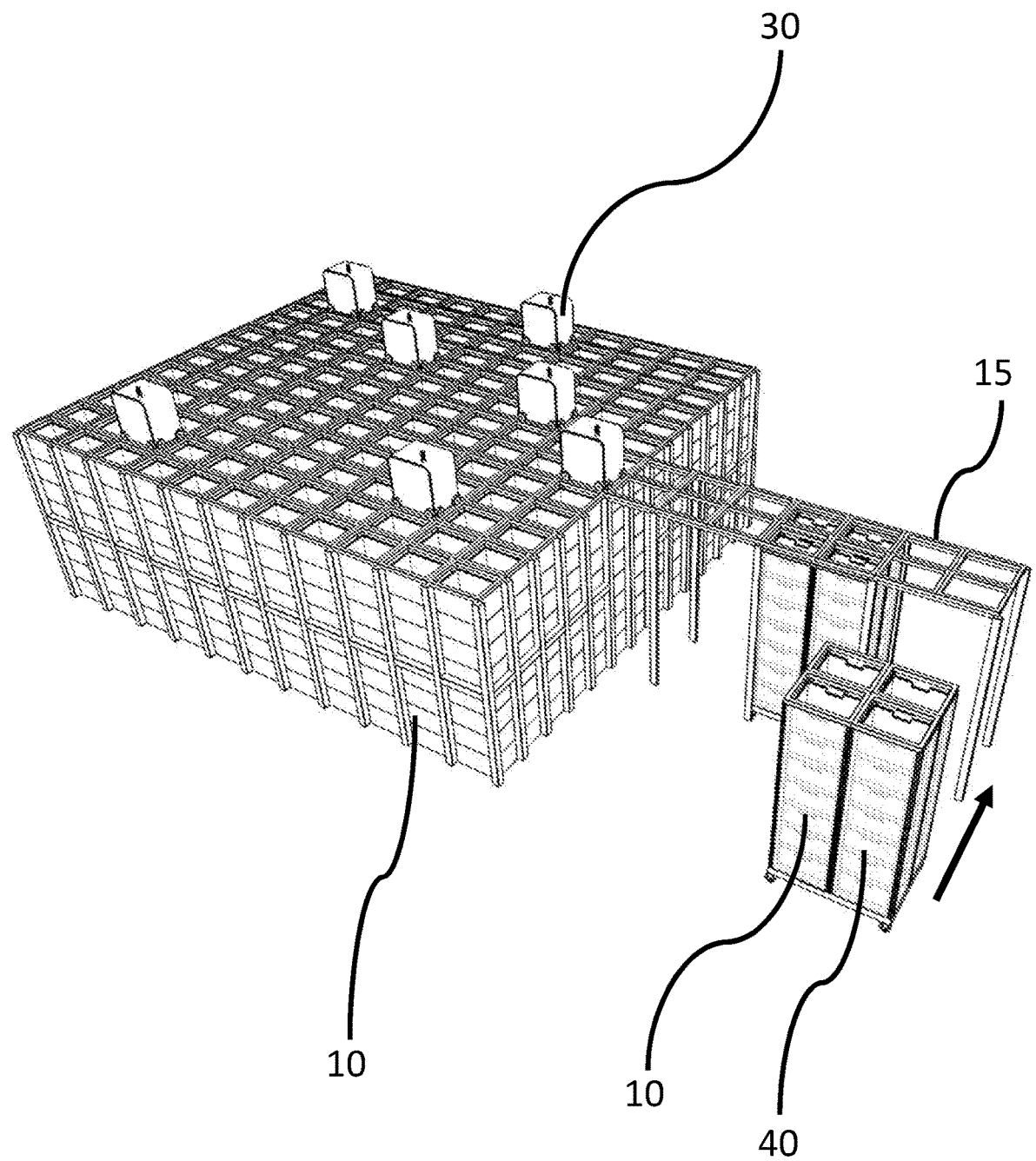
Figure 7:
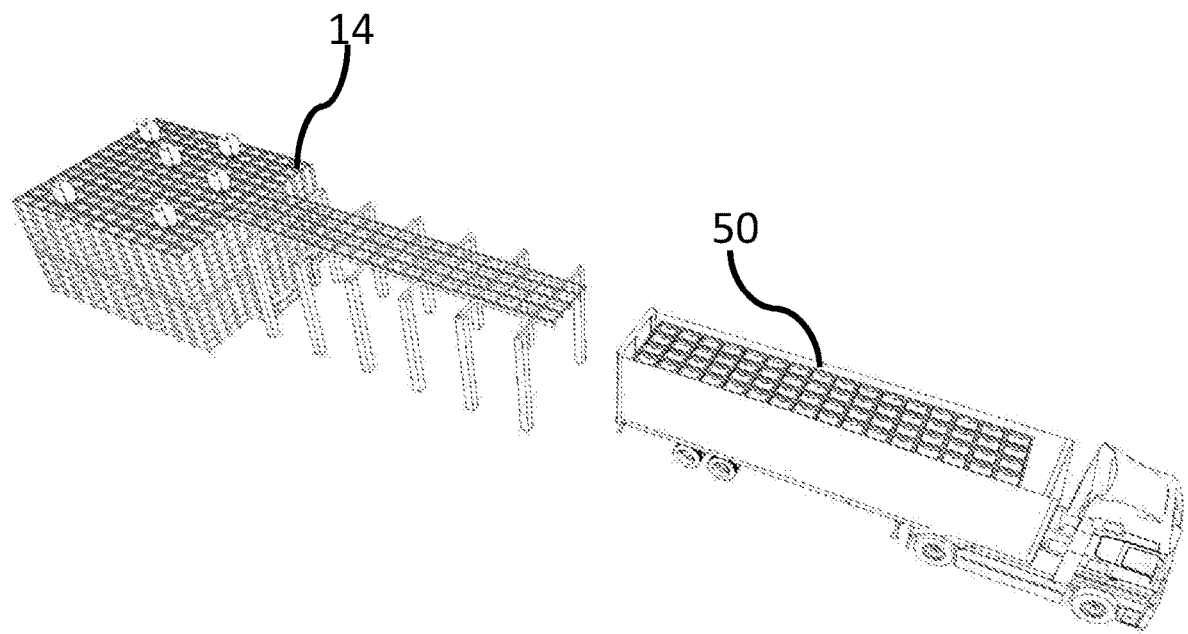
Figure 8:
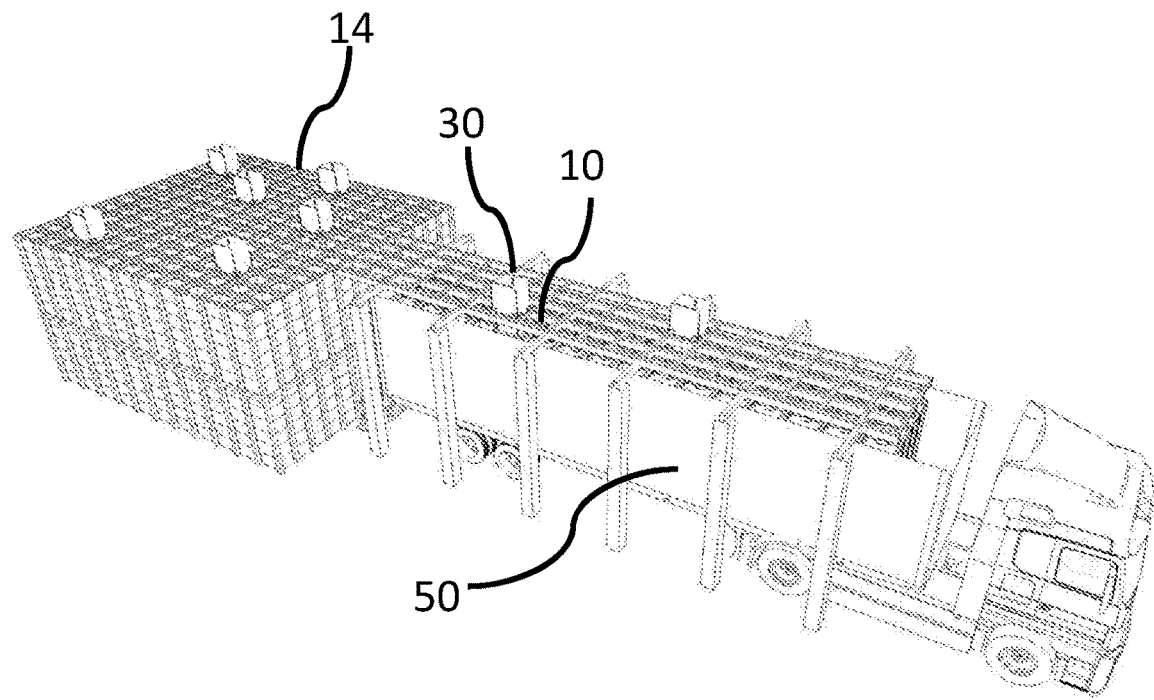
Figure 9:
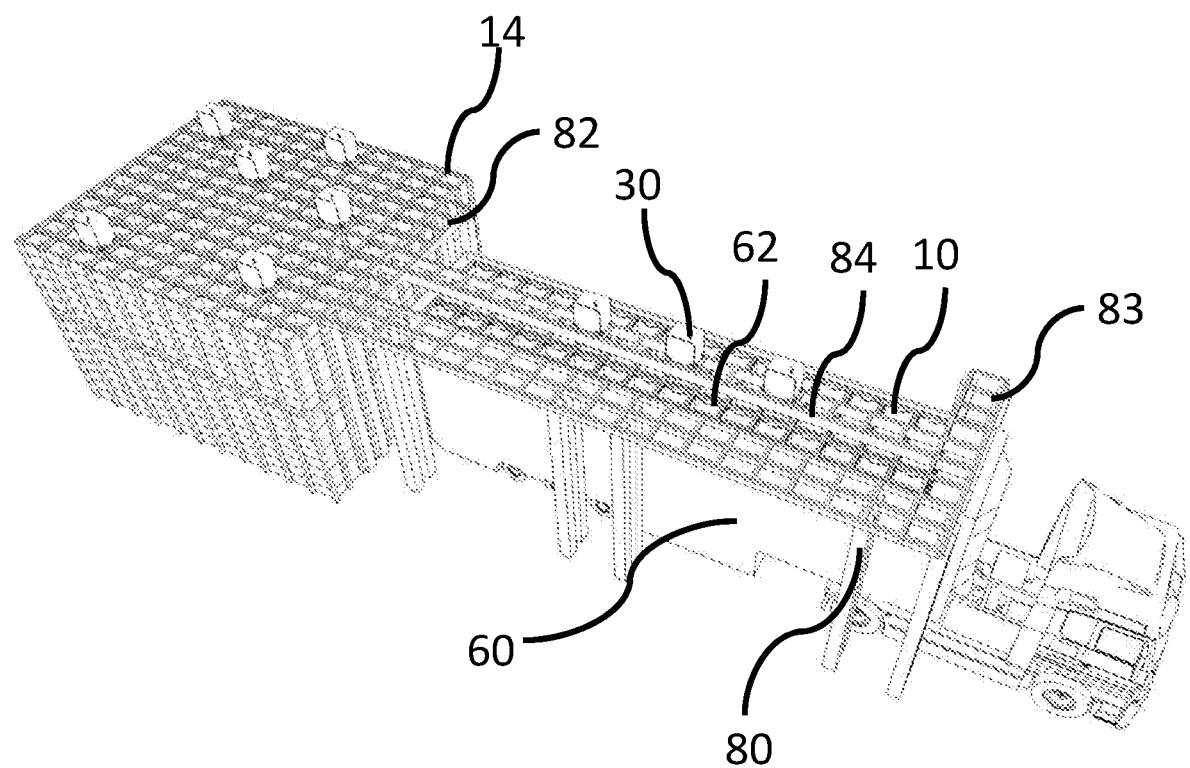
Figure 10A:
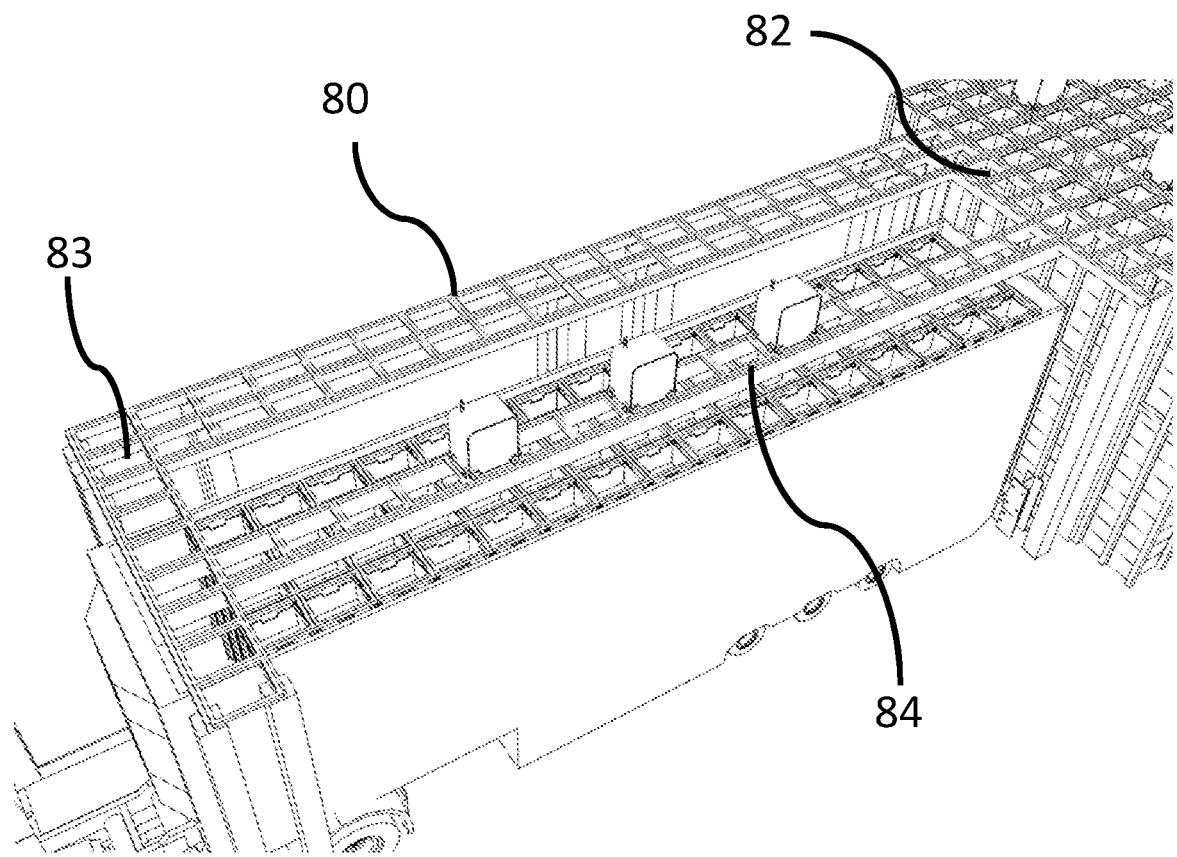
Figure 10B:
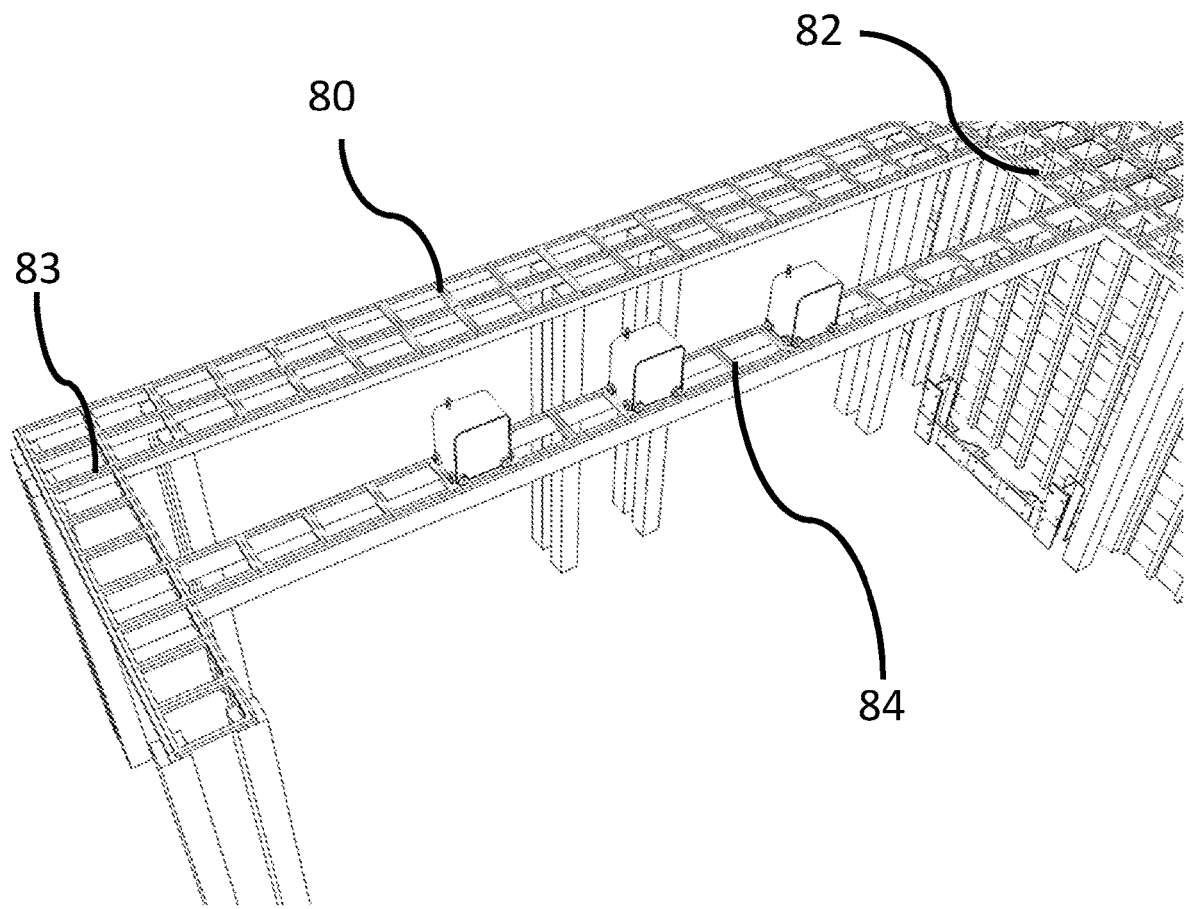
Figure 11A:
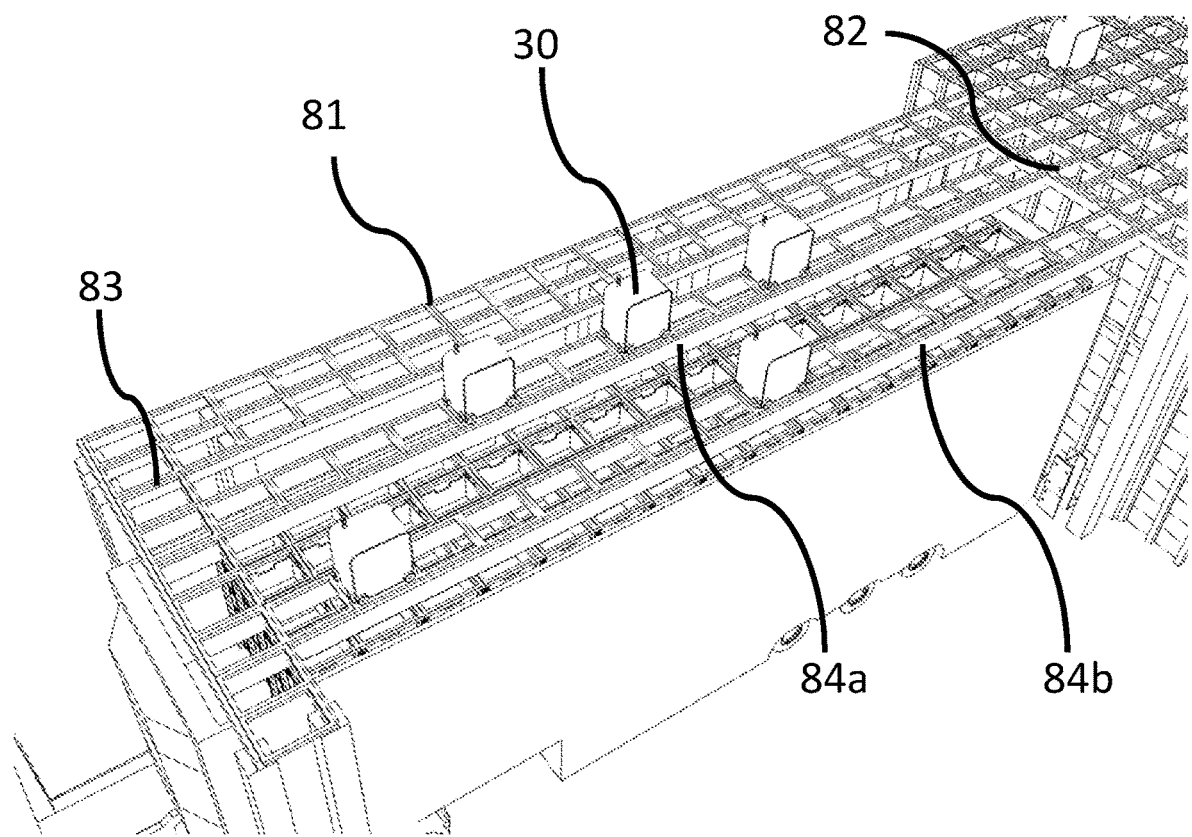
Figure 11B:
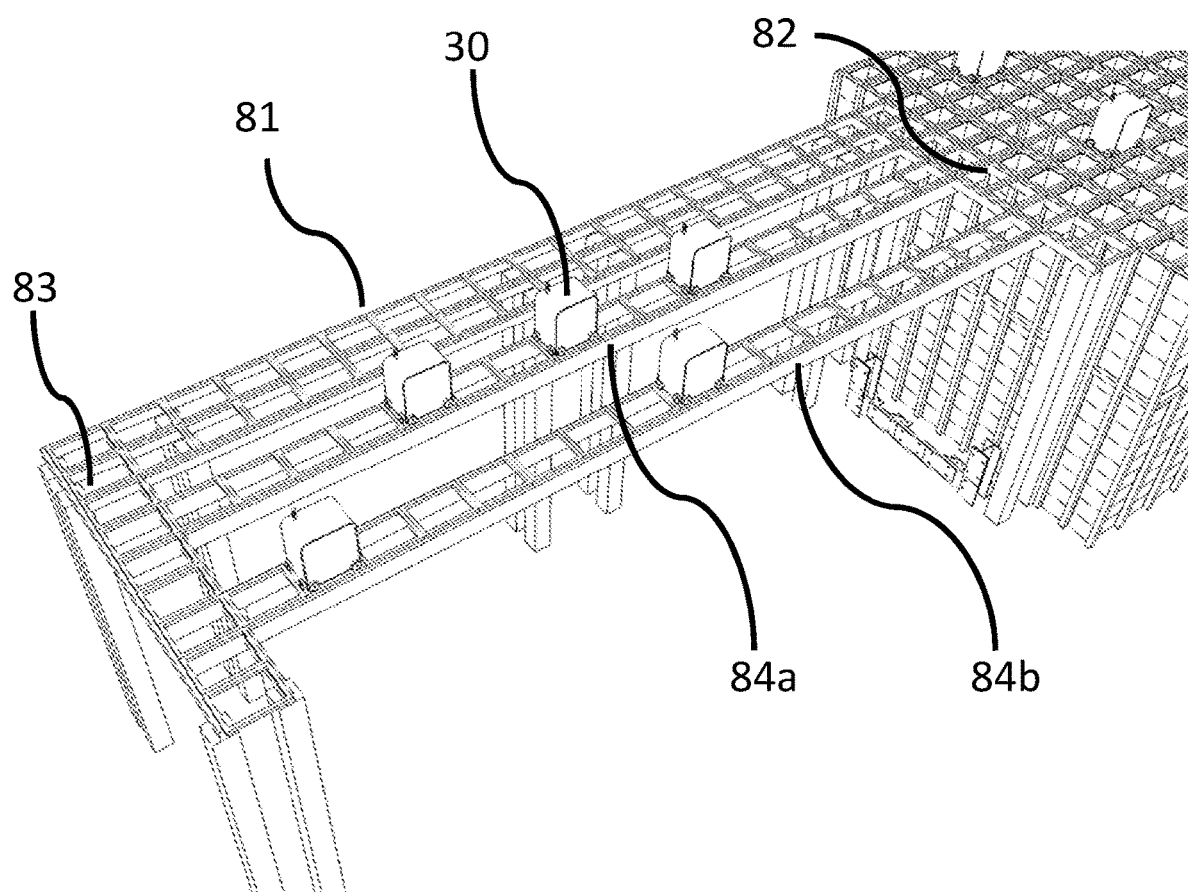
Figure 12B:
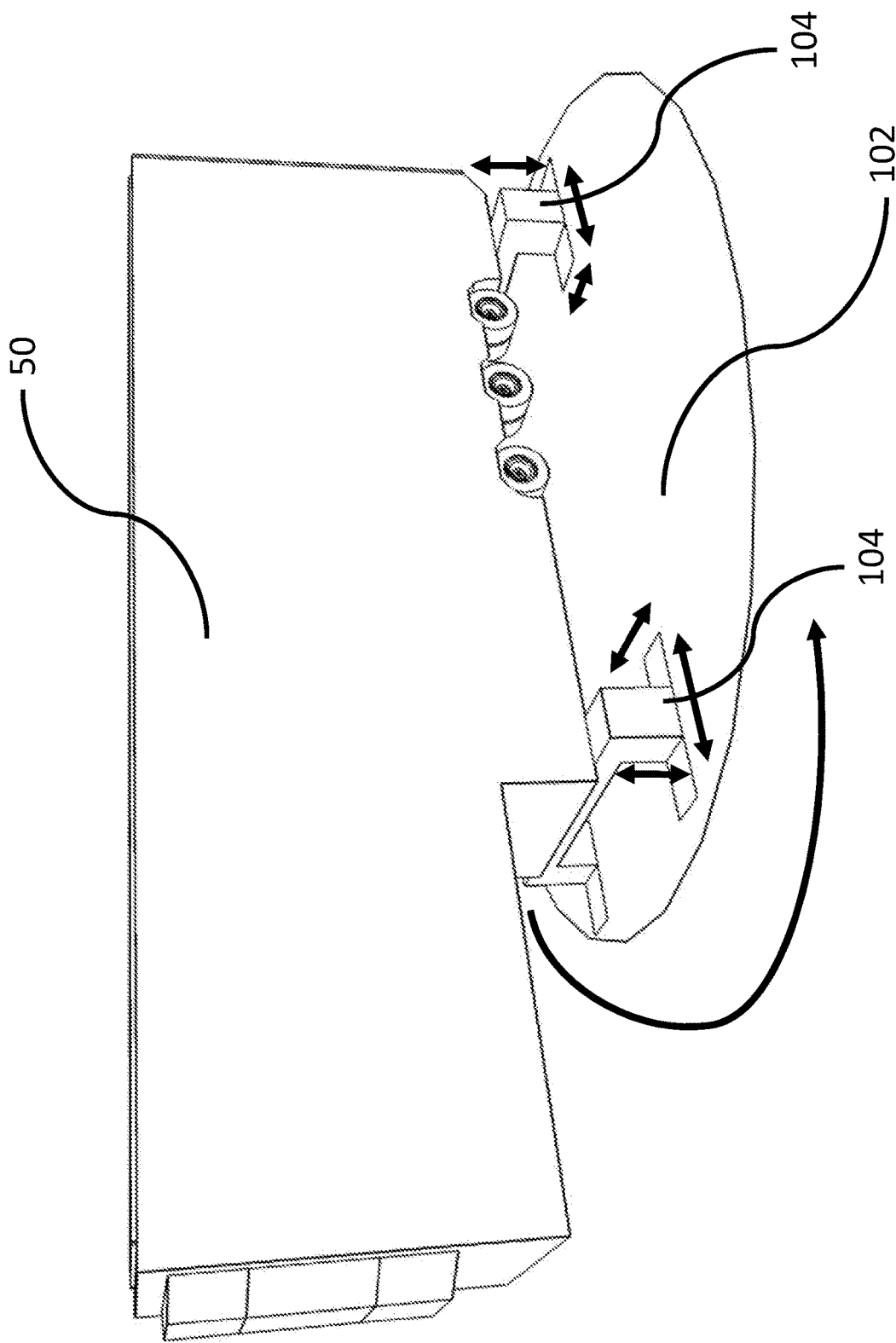
Figure 12C:
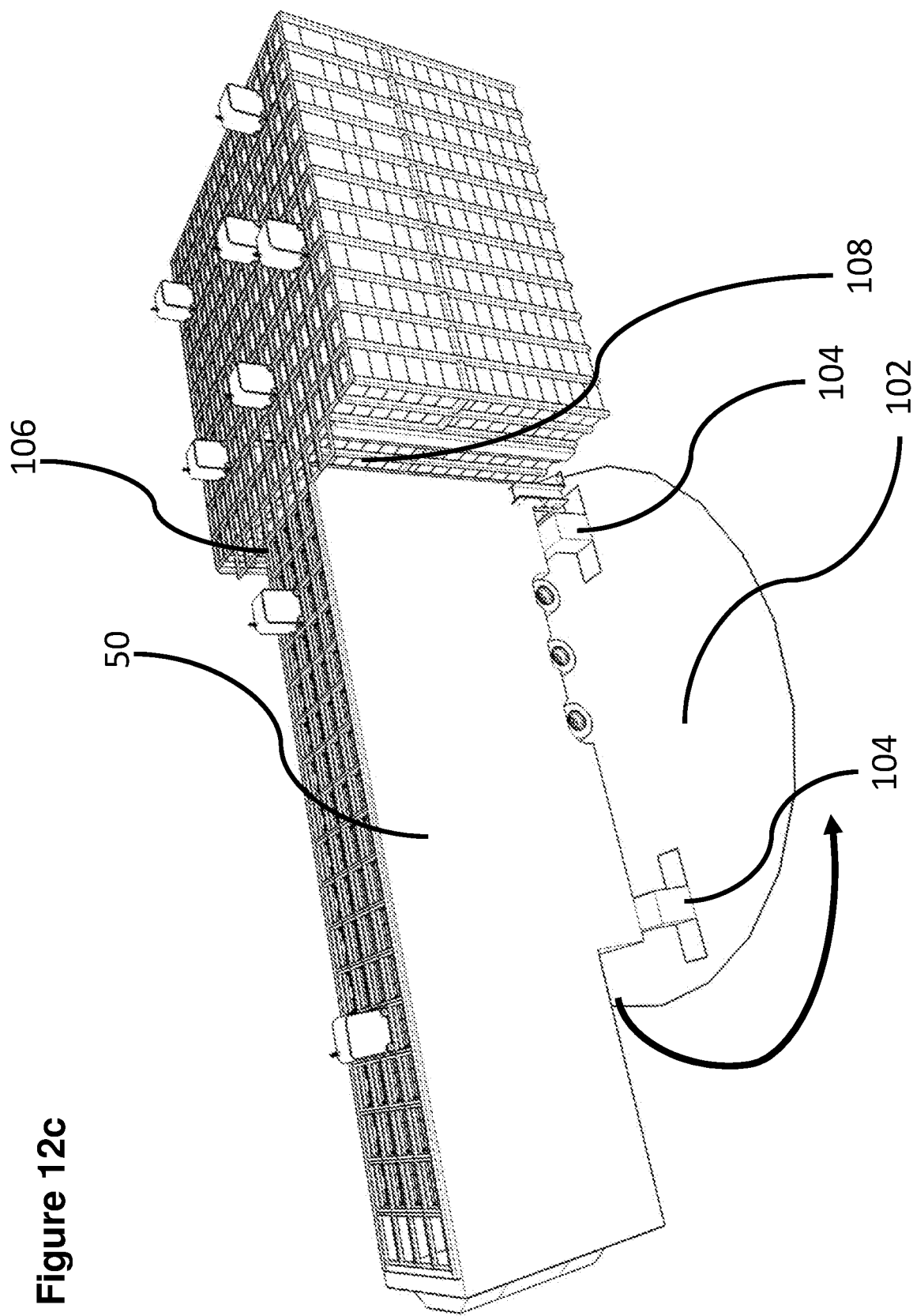

FIGS. 3(a) and 3(b) are schematic perspective views, from the rear and front respectively, of one form of robotic load handling device for use with the frame structure of FIGS. 1 and 2, and FIG. 3(c) is a schematic perspective view of the known load handler device in use lifting a bin;

FIG. 4 is a schematic perspective view of a known storage system comprising a plurality of load handler devices of the type shown in FIGS. 3(a), 3(b) and 3(c), installed on the frame structure of FIGS. 1 and 2, together with a robotic service device in accordance with one form of the invention;

FIG. 5a is a schematic perspective view of the storage system of FIGS. 1 to 4 in accordance with a first embodiment of the invention, in which a number of the stacks of bins are detachable and moveable independently of the remainder of the stacks of bins, the stacks of bins being located in at least one roll cage;

FIG. 5b is a schematic perspective view of the system of FIG. 5a showing the roll cage in situ in the stacks of bins, one robotic load handling device depositing a bin into the roll cage;

FIG. 6 is a schematic perspective view of the storage system of FIGS. 1 to 4 in accordance with a second embodiment of the invention, in which a portion of the grid extends beyond the storage system and is supported at a height such that a roll cage may be positioned thereunder to facilitate automatic loading of the roll cage using load handling devices operative on the grid of the storage and retrieval system;

FIG. 7 is a schematic perspective view of a section of frame structure supported in position at a height such that a trailer or other vehicle may be moved under the section of frame structure;

FIG. 8 is a schematic perspective view of FIG. 7 showing the trailer 50 located under the section of frame structure, the section of frame structure supporting robotic load handling devices above the trailer, the load handling devices removing or depositing bins from the trailer;

FIG. 9 shows a third embodiment of the invention in which the bins in the trailer are stacked in a tighter packing arrangement than the bins stacked in the corresponding storage and retrieval system, the frame structure located above the trailer being provided with a moveable track to enable robotic load handling devices from such a warehouse to be moved in to position above a stack of bins and to remove or deposit bins from the trailer to the warehouse or vice versa, irrespective of the comparative packing density of the bins;

FIGS. 10a and 10b show a schematic perspective view of the embodiment of FIG. 9 in which the bins in the trailer are stacked in a tighter packing arrangement than the bins stacked in a corresponding storage and retrieval system, the frame structure located above the trailer being provided with a moveable track to enable robotic load handling devices from such a warehouse to be moved in to position above a stack of bins and to remove or deposit bins from the trailer to the warehouse or vice versa, irrespective of the comparative packing density of the bins;

FIGS. 11a and 11b show a perspective view of a further form of the embodiment of the invention of FIGS. 9 and 10 but in which the frame structure above the trailer or other vehicle is provided with a plurality of moveable tracks;

FIGS. 12a and 12b show a perspective view of a fourth embodiment of the invention in which at least a portion of a vehicle roof comprises a portion of grid, the grid being shaped and sized so as to interface with a grid structure of the storage and retrieval system of a storage and retrieval system the system further comprising alignment means to enable the vehicle and the two grid portions to be relatively aligned; and FIG. 12c is a schematic perspective view of the vehicle of FIG. 12a in situ against the storage and retrieval system, the vehicle having being aligned using the system of FIG. 12b, the storage and retrieval system being provided with an interface portion of grid structure to allow smooth movement of load handling devices from the storage and retrieval system to the grid forming part of the vehicle and vice versa.

Figure 13A:
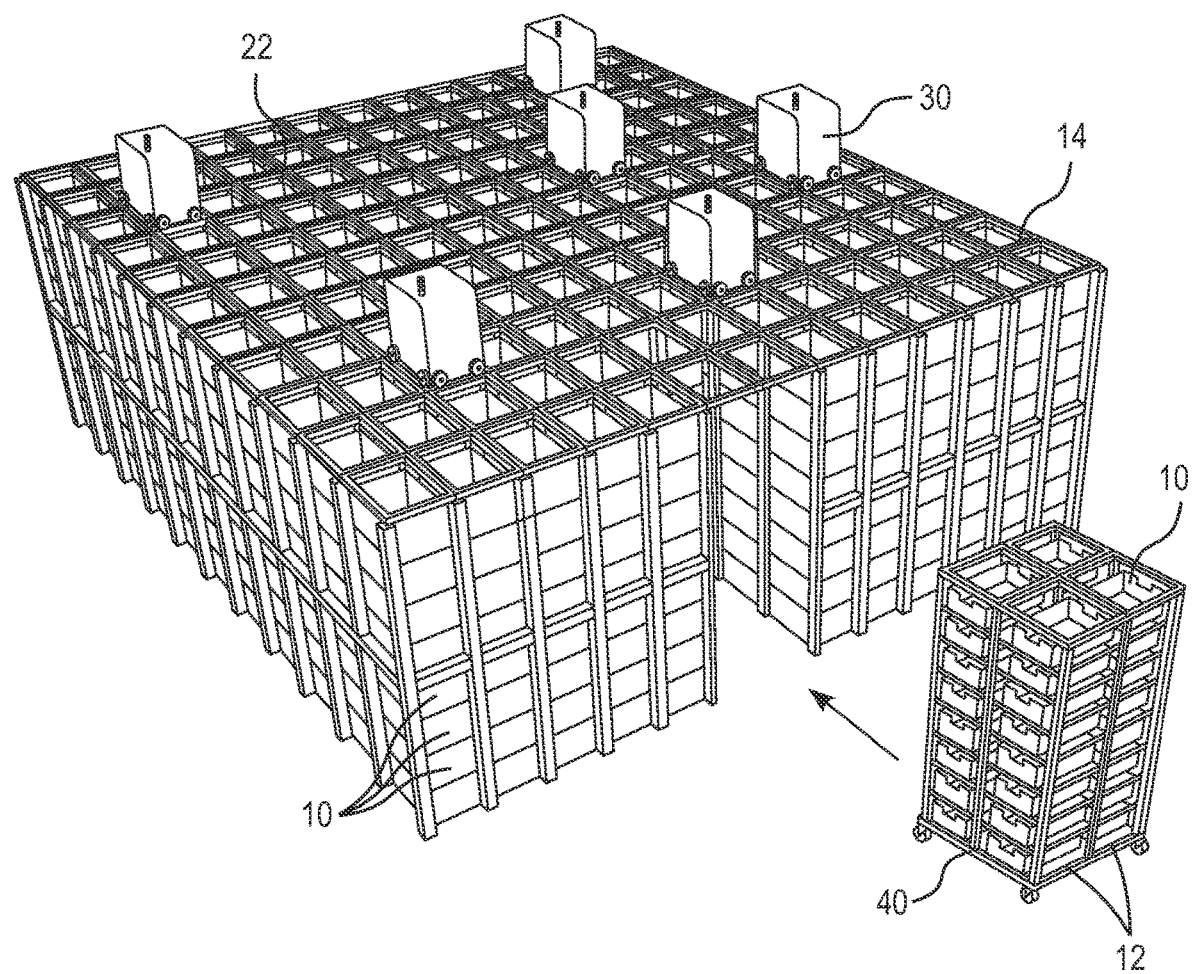
Figure 13B:
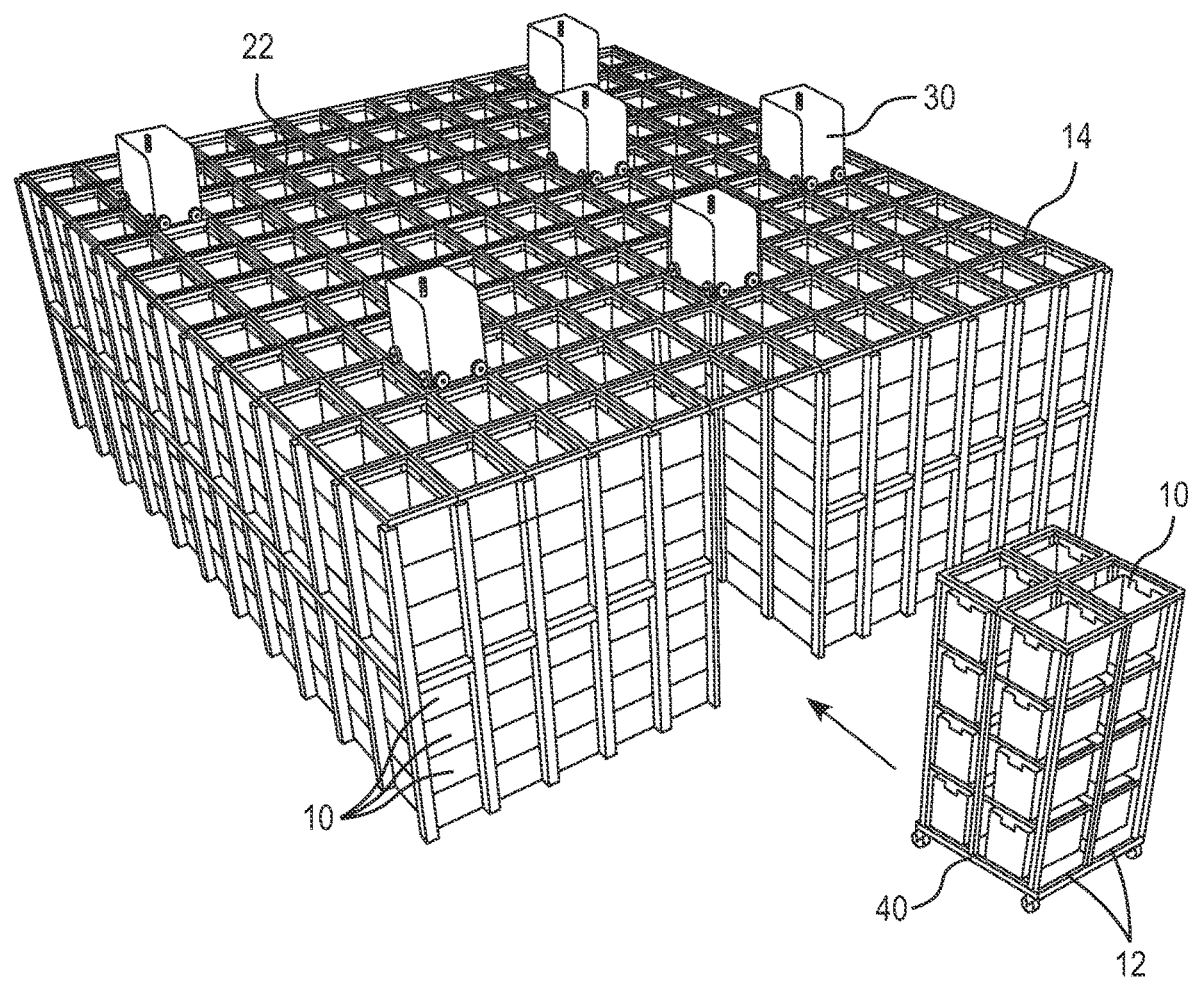

FIGS. 13a and 13b are schematic perspective views of the storage system of FIG. 5a in accordance with an embodiment of the disclosure showing containers of different sizes.

As shown in FIGS. 1 and 2, stackable containers, known as bins 10, are stacked on top of one another to form stacks 12. The stacks 12 are arranged in a grid frame structure 14 in a warehousing or manufacturing environment. FIG. 1 is a schematic perspective view of the frame structure 14, and FIG. 2 is a top-down view showing a single stack 12 of bins 10 arranged within the frame structure 14. Each bin 10 typically holds a plurality of product items (not shown), and the product items within a bin 10 may be identical, or may be of different product types depending on the application.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 are lifted clear of the rails 22, and the second set of wheels 36 are lowered into engagement with the second set of rails 22a. The drive mechanism can then be used to drive the second set of wheels 36 to achieve movement in the Y direction.

In this way, one or more robotic load handling devices 30 can move around the top surface of the stacks 12 on the frame structure 14 under the control of a central picking system (not shown). Each robotic load handling device 30 is provided with means for lifting out one or more bins or containers from the stack to access the required products. In this way, multiple products can be accessed from multiple locations in the grid and stacks at any one time.

FIG. 4 shows a typical storage system as described above, the system having a plurality of load handling devices 30 active on the stacks 12. In addition, a robotic service device 50 is positioned on the grid 14.

FIG. 5a shows a roll cage to be used with the first or second embodiments. The roll cage 40 is designed to hold a plurality of stacks 12 of bins 10, typically four in a 2×2 arrangement. The roll cage is moveable on wheels, for example, such that it may be moved on a warehouse floor and onto and within a vehicle. Furthermore the roll cage 40 may slot securely into the frame structure 14 in a way which enables automatic loading and unloading of bins 10 by robotic load handling devices 30 running on rails 22 on top of the frame structure 14. It will be appreciated that the roll cage 40 may be moved manually into position within a suitable sized cut-out portion of the storage and retrieval system as shown in FIG. 5b. Alternatively, the roll cage 40 may be robotically or automatically moved into position within the stack. The roll cage 40 is secured in place by suitable securing means (not shown). The securing means may be a mechanical locking device or a magnetic locating device or other suitable positioning and locking means. It will be appreciated that the securing means may alternatively comprise electronic positioning and locking means. It will be appreciated that any suitable form of positioning and securing means may be used that prevents movement of the roll cage with respect to the stacks 12 of bins 10.

The roll cage 40 preferably comprises 4 stacks 12 of bins 10 arranged in a 2×2 cross sectional arrangement. However it will be appreciated that any number of stacks 12 may be used and arranged accordingly.

FIG. 5b shows the roll cage 40 of FIG. 5a when attached to the frame structure 14 and in the process of receiving a bin 10 by means of a robotic load handling device 30.

It will be appreciated that whilst an area under the horizontal grid of the framework structure 14 may be left vacant in order to accept the roll cage 40, it is equally possible for a portion of the horizontal grid of the frame structure 14 above the stacks 12 of bins 10 to extend beyond the top surface area of the stacks 12. In this way, a roll cage 40 may be moved into position under the extended horizontal grid 15 and adjacent the more permanently positioned stacks 12, as shown in FIG. 6.

In use, an empty roll cage 40 is moved in to position either within the framework of the storage and retrieval system in accordance with the first embodiment of the invention, or under the extended portion of the horizontal grid, in accordance with the second embodiment of the invention.

The empty roll cage 40 may then be loaded with bins forming delivery containers DT comprising items to be delivered to customers, or the bins or containers may comprise inventory items for onward delivery by appropriate vehicle to alternative storage and retrieval systems co-located at the same location or at remote alternative locations.

When the roll cage 40 is moved in to position under the appropriate portion of grid, a levelling mechanism (not shown) is preferably employed to ensure that bins or containers to be inserted in to or removed from the roll cage 40 are correctly aligned to enable engagement with winch assembly means within the load handling devices 30. It will be appreciated that there are many methods of aligning the roll cage bins and containers such that the load handling devices 30 may collect and deposit them accurately as required. The area beneath the portions of grid on to which the roll cage is moved may be provided with plates capable of movement in X, Y and Z directions, for example. The plates may be moveable by mechanical means, electromechanical means or hydraulic means. Furthermore, the means for aligning a roll cage may be provided with locating and securing means such as a releasable latch mechanism to ensure the roll cage is secured once aligned.

FIG. 7 shows a vehicle to be used in association with the third embodiment being backed into the frame structure 14. The vehicle comprises a cab portion 52 and a trailer portion 50. However, it will be appreciated that any form of vehicle may for example, but not limited to, lorries, vans, vehicles comprising trailer portions and any form of vehicle capable of carrying containers in bins in such a manner and being loaded and unloaded as described herein. In this embodiment, a portion of the frame structure 14 extends beyond the stacks 12 and forms an area of grid supported at a height suitable for such a road going trailer 50 to be positioned beneath. The trailer 50 contains stacks 12 of bins 10 arranged in such a fashion that positioning the trailer 50 beneath the frame structure 14 extension enables robotic load handling devices 30 30 to be moved into position above the trailer 50 to remove bins 10 from the stacks 12 in the trailer 50. The bins 10 in the trailer 50 may be held on roll cages in a fashion similar to that described in the first and second embodiment above. However, any suitable method of securing the bins 10 in the trailer 50 may be used compatible with removing the bins 10 using the bots 30.

In this embodiment, the trailer 50 is provided with a retractable roof such which can be secured to the building in such a way that the grid structure on the trailer 50 aligns with an overhead grid, on which the robotic load handlers 30 can travel. This means that the trailer space will essentially be inside the building, or at least under a roof with adequate weather protection around it. In this embodiment, the grid pitch on the vehicle and in the storage system is the same.

FIG. 8 shows the trailer 50 of FIG. 7 when located adjacent to the frame structure 14 and in the process of receiving a bin 10 by means of a robotic load handling device 30. It will be appreciated that the trailer may simply be located beneath the frame structure 14 as shown in the Figures. However, in order to ensure alignment of the bins 10 in the trailer 50 with the grid of the frame structure 14 extension, it may be necessary to attach the trailer 50 to the frame structure 14 by suitable means. This may include, but not be limited to mechanical attachment means or mechanical co-operating means located on the trailer and the frame structure 14 supports. Furthermore, the trailer and the frame structure may be provided with location assisting means (not shown) to enable the trailer 50 to be positioned accurately beneath the frame structure 50. The location assisting means may include ultrasonic distance detecting means or optical positioning means such as a camera and suitably positioned markers but it will be appreciated that any other suitable means may be used.

FIG. 9 shows a loading station 80 to be used with a fourth embodiment of the invention, situated above a trailer 60 with a different pitch of horizontal grid part of the frame structure 62, compared with the frame structure 14 used in the storage and retrieval system, enabling a larger number of bins 10 to be carried in the trailer 50 than in the equivalent volume of framework structure in the storage and retrieval system.

In use, in the loading station 80 robotic load handling devices 30 first travel on a track 82 perpendicular to the trailer 60. Then the robotic load handling devices change direction and travel on a moveable track 84, which can slide along the tracks 82 and 83. Once the robotic load handling device 30 has deposited and/or retrieved a bin 10 at the intended positions within the frame structure 62, it continues to a track 83 at the other end of the trailer 60, and then back to the main frame structure 14.

The single track running the length of the trailer is capable of sliding movement rightwardly and leftwardly with respect to the trailer 50 in order to be positioned above each row of stacks. At both ends, this moveable track connects to a perpendicular track which enables the robotic load handlers 30 to travel from the fixed grid in the building to the moveable track over the trailer in order that they may deposit or retrieve a container and then return to the fixed grid in the building.

FIGS. 10*a* and 10*b* show more details of the loading station 80 of FIG. 9 with static tracks 82 and 83 and moveable track 84 with the trailer 60 in situ and not present for clarity.

FIGS. 11*a* and 11*b* show an alternative configuration of loading station 81 to that shown in FIGS. 9 and 10 and described in more detail above. The loading station 81 is provided with two moveable tracks 84*a* and 84*b* sliding on static tracks 82 and 83. As can be seen in these figures, multiple robotic load handling devices 30 may simultaneously travel on these tracks.

FIG. 12*a* shows a further embodiment of the invention in which the top of the trailer 50 of the vehicle comprises a portion of grid structure. The grid structure may be covered by a deployable tarpaulin or a retractable roof. In a manner similar to that described above in relation to the roll cage, the trailer 50 of the vehicle is positioned adjacent a storage and retrieval system as described above. It will be appreciated that in order to facilitate movement of load handling devices from the storage and retrieval system, above the stacks 12 of containers and bins 10, to the grid forming part of the roof or top of the trailer 50, an interface is required. The interface 106 is shown in FIG. 12*c*. The interface 106 comprises a portion of substantially horizontal grid structure located above a loading and unloading bay.

In use, the vehicle carrying containers or bins in stacks or awaiting loading of bins and containers in to the vehicle is located adjacent the storage and retrieval system such that the interface portion 106 provides a transition point from the grid of the storage and retrieval system to the grid forming part of the vehicle.

It will be appreciated that such an interface portion requires the two separate portions of horizontal grid structure to be substantially aligned. In the case of a vehicle or a trailer, the alignment may be achieved in a number of ways. FIG. 12s shows one form of alignment mechanism 100. The mechanism comprises a plate 100 on to which the vehicle is positioned. The plate is capable of movement at least in the X, Y and Z directions. Furthermore the plate 100 may be capable of a tilting movement. The plate may be moved by suitable motorised mechanical means or via other means such as hydraulics or any other suitable method.

FIG. 12b shows an alternative method of aligning the vehicle or a part, such as the trailer 50, thereof, with respect to the storage and retrieval system. In this example, stand portions 104 are used to lift the trailer 50 of the vehicle. The stand portions are capable of movement in the X, Y and Z direction. The stand portions may also be rotatable about a point to enable a further degree of movement. It will be appreciated that the stand portions 104 may be independently moveable by suitable moving means and/or may be mounted on a rotatable plate 102 such that rotating movement is achieved independently of the movement of the stand portions 104.

It will be appreciated that these are examples of alignment mechanisms only and that the skilled person in the art would be aware of alternative mechanisms capable of fulfilling the requirement of aligning the portion of grid forming part of the vehicle and the portion of grid forming part of the framework structure of the storage and retrieval system.

In all of the embodiments described above, it will be appreciated that the load handling devices 30 may be removing bins 10 from the stacks 12 and locating them within the roll cages 40 or trailers 50, 60. Additionally, the load handling devices 30 may be removing bins or containers 10 from the roll cages 40 or trailers 50, 60 and locating them within the stacks 12. It will further be appreciated that the load handling devices 30 may be of different sizes such that bins 10 of differing sizes may be moved and transported by load handling devices 30 of appropriate sizes. This may require the grid spacing of the frame structure 14 to be sized accordingly to accommodate such different sized bots 30 and bins 10.

Furthermore, it will be appreciated that the trailers 50, 60 and roll cages 40 described may be of any size and configuration and are not limited to the size and configuration shown in the Figures or described above. The trailers may be suitable for transportation of ambient, chilled or frozen goods using refrigerated trailers as necessary. Moreover, the stacks 12 of bins 10 may contain any number of bins and are not limited to the number shown in the Figures.

Moreover, it will be appreciated that the storage and retrieval system may comprise an object picking system acting in response to customer orders in the case of an on line retailer for example, or it may be operable to sort, store and pick other objects such as parcels or mail for collection and delivery.

It will be appreciated that whilst the Figures depict a vehicle of an articulated form, the invention is equally applicable to any vehicle capable of having a portion of grid mounted thereon. It will be further appreciated that these vehicles may comprise fixed sides or may comprise sides or a flexible or retractable nature. Furthermore, the roof or top of the vehicle may have a portion of grid mounted thereon, or the grid may form part of the structure of the vehicle.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

The invention claimed is:

1. A system, comprising:
   a storage workspace including,
      a first framework defined by a series of first uprights, the first uprights supporting a grid of two substantially perpendicular sets of rails, and
      a plurality of containers for storing objects, wherein the plurality of containers are arranged in stacks, each stack of containers is located underneath a grid space in the workspace; and
   a grid extension including a continuation of the two substantially perpendicular sets of rails, and wherein the plurality of containers can be moved by one or more load handling devices between the storage workspace and an area beneath the grid extension, wherein the area beneath the grid extension is configured for positioning a vehicle such that containers can be placed or removed from the vehicle, and stacks of containers in the vehicle have a packing density greater than a packing density of the stacks in the workspace.

2. The system according to claim 1, wherein the storage workspace includes a second framework extending from the first framework, the second framework defined by a series of second uprights, the second uprights supporting the grid extension.

3. The system according to claim 1, wherein the one or more load handling devices are arranged to operate on the grid of rails and are enabled to move along the rails to any point on the grid above the workspace or above the area beneath the grid extension, wherein the load handling devices include,
   means for removing or replacing at least one of the plurality of containers from the stacks, and
   means for transporting said at least one container to another position on the grid.

4. The system according to claim 1, wherein the one or more load handling devices move between the grid supported by the first framework and the grid extension supported by the second framework.

5. The system according to claim 1, wherein each of the one or more load handling devices include:
   a body mounted on wheels;

a first set of wheels arranged to engage with at least two rails of the first set of rails, and a second set of wheels being arranged to engage with at least two rails of the second set of rails, the first set of wheels being independently moveable and driveable with respect to the second set of wheels such that when in motion only one set of wheels is engaged with the grid at any one time.

6. The system according to claim 1, wherein the grid extension include:

at least one set of rails that is moveable, such that load handling devices operating on the grid extension may be moved by the movable set of rails to position the load handling device relative to the stacks of containers in the vehicle.

7. The system according to claim 1, wherein the vehicle is a refrigerated vehicle.

8. The system according to claim 1, wherein the vehicle is an articulated truck or a van.

9. The system according to claim 1, wherein a portion of the containers stacks positioned in the workspace are independently moveable with respect to remaining stacks in the workspace.

10. The system according to claim 9, wherein the moveable portion of stacks may be removed from or replaced in to the workspace by mechanical moving means.

11. The system according to claim 10, wherein the mechanical moving means comprises:

a roll cage mounted on wheels maneuverable into position within the workspace by manual or robotic means.

12. The system according to claim 10, wherein the mechanical moving means include one of a roll cage or a dolly or a vehicle or a van or an articulated lorry, or a vehicle having a trailer.

13. The system according to claim 1, wherein the workspace comprises:

containers of more than one size.

14. A system according to claim 13 comprising:

at least one load handling device configured for engaging and lifting each size of container.

15. The system according to claim 1, wherein the vehicle includes a top portion, the top portion including a grid structure configured to engage the grid of the storage workspace.

16. The system according to claim 15 comprising:

an interface arranged between the top portion grid structure and the grid of the storage workplace for allowing movement of the load handling device therebetween.

* * * * *